United States Patent
Hori et al.

(10) Patent No.: US 11,978,252 B2
(45) Date of Patent: May 7, 2024

(54) COMMUNICATION SYSTEM, DISPLAY APPARATUS, AND DISPLAY CONTROL METHOD

(71) Applicants: Yuki Hori, Tokyo (JP); Eri Watanabe, Tokyo (JP); Takuro Yasuda, Tokyo (JP); Kentaroh Hagita, Kanagawa (JP); Takuroh Naitoh, Tokyo (JP); Hiroaki Tanaka, Tokyo (JP); Terunori Koyama, Tokyo (JP)

(72) Inventors: Yuki Hori, Tokyo (JP); Eri Watanabe, Tokyo (JP); Takuro Yasuda, Tokyo (JP); Kentaroh Hagita, Kanagawa (JP); Takuroh Naitoh, Tokyo (JP); Hiroaki Tanaka, Tokyo (JP); Terunori Koyama, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/499,935

(22) Filed: Oct. 13, 2021

(65) Prior Publication Data
US 2022/0114367 A1    Apr. 14, 2022

(30) Foreign Application Priority Data

Oct. 13, 2020  (JP) ................................ 2020-172875
Mar. 16, 2021  (JP) ................................ 2021-042953
Oct. 4, 2021   (JP) ................................ 2021-163685

(51) Int. Cl.
*G06V 20/20*    (2022.01)
*G06F 18/214*   (2023.01)
(Continued)

(52) U.S. Cl.
CPC .......... *G06V 20/20* (2022.01); *G06F 18/2148* (2023.01); *G06F 40/20* (2020.01);
(Continued)

(58) Field of Classification Search
CPC .. G06V 20/20; G06V 30/293; G06V 2201/02; G06F 40/20; G06F 16/51; G06F 40/169; G06F 40/284; G06F 40/30; G06F 40/216; G06F 16/53; G06K 9/6257; G06T 11/60; G06T 2200/24
See application file for complete search history.

(56) References Cited

U.S. PATENT DOCUMENTS 9,323,250 B2 *  4/2016  Wang .................... G16H 40/67
11,582,174 B1 *  2/2023  Srinivasan .......... G06F 3/04842
(Continued)

FOREIGN PATENT DOCUMENTS

JP    6-131437     5/1994
JP    8-315108     11/1996
(Continued)

*Primary Examiner* — Said Broome
*Assistant Examiner* — Andrew Shin
(74) *Attorney, Agent, or Firm* — XSENSUS LLP

(57) ABSTRACT

A communication system includes circuitry. The circuitry receives an input of language information. The circuitry performs recognition on the input language information. The circuitry displays one or more images corresponding to the input language information on a display, based on a result of the recognition.

13 Claims, 34 Drawing Sheets

(51) Int. Cl.
*G06F 40/20* (2020.01)
*G06T 11/60* (2006.01)
*G06V 30/28* (2022.01)

(52) U.S. Cl.
CPC .......... *G06T 11/60* (2013.01); *G06T 2200/24* (2013.01); *G06V 30/293* (2022.01); *G06V 2201/02* (2022.01)

(56) References Cited

U.S. PATENT DOCUMENTS

| | | | | |
|---|---|---|---|---|
| 2008/0134070 | A1* | 6/2008 | Kobayashi | G06F 3/0485 |
| | | | | 715/767 |
| 2013/0054248 | A1* | 2/2013 | Ohno | G06F 3/017 |
| | | | | 704/E21.001 |
| 2013/0179165 | A1* | 7/2013 | Holman | G10L 21/10 |
| | | | | 704/235 |
| 2019/0192118 | A1* | 6/2019 | Roundhill | A61B 8/0866 |

FOREIGN PATENT DOCUMENTS

| | | |
|---|---|---|
| JP | 9-134443 | 5/1997 |
| JP | 10-240915 | 9/1998 |
| JP | 2017-004270 | 1/2017 |
| JP | 2018-136874 | 8/2018 |

\* cited by examiner

FIG. 18
(a)
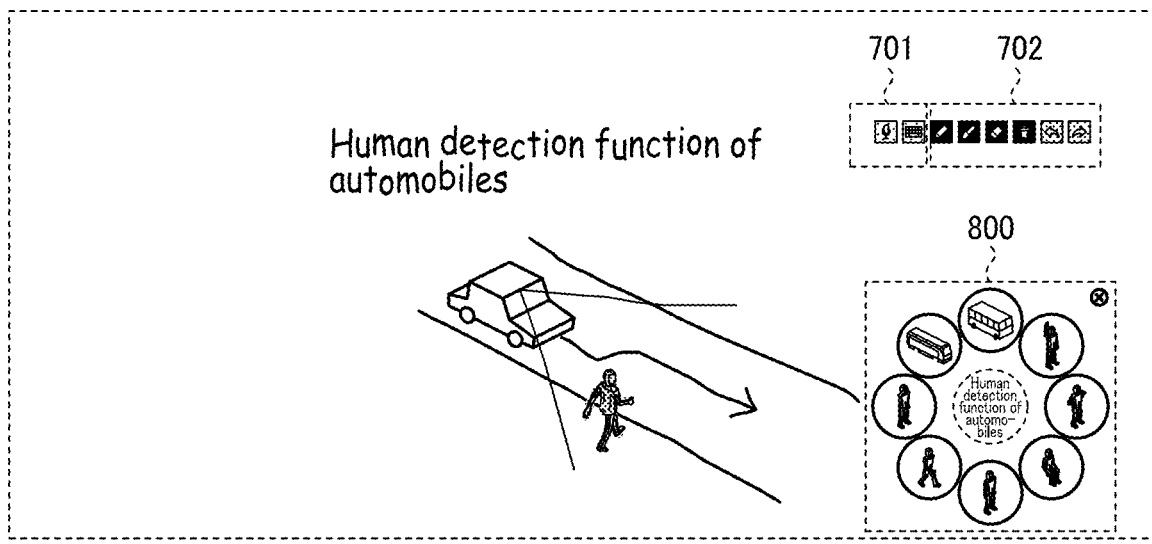
(b)
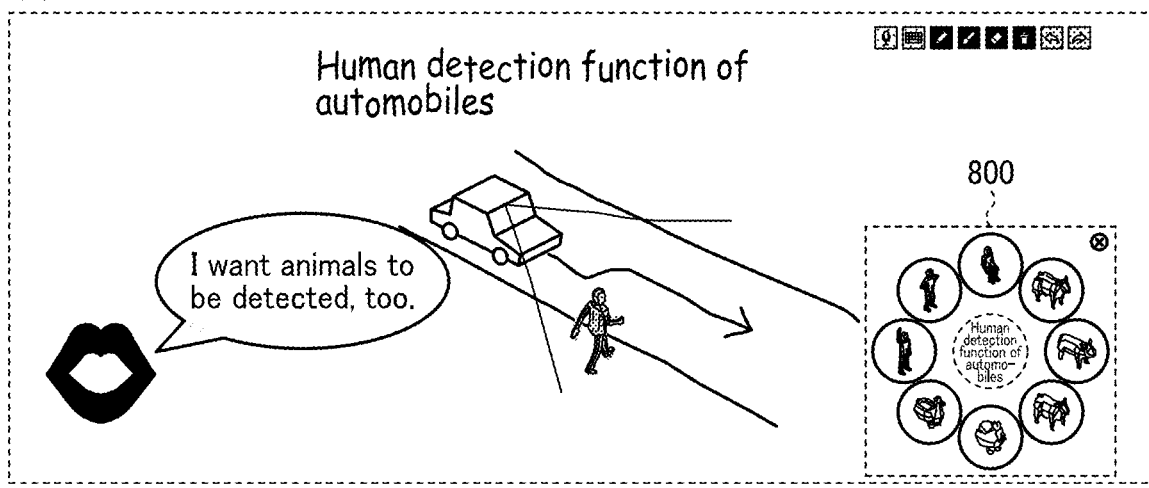

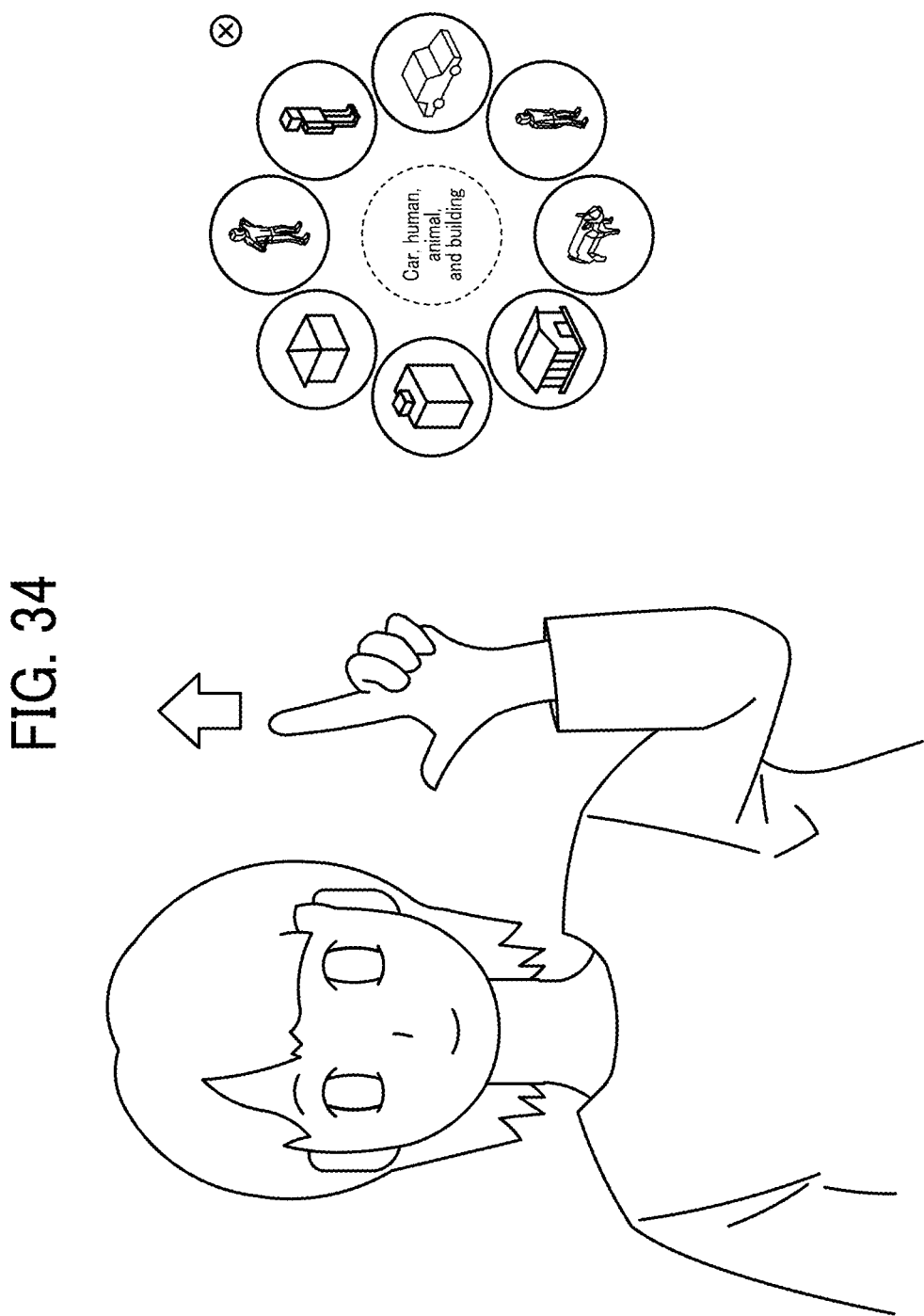

COMMUNICATION SYSTEM, DISPLAY APPARATUS, AND DISPLAY CONTROL METHOD

CROSS-REFERENCE TO RELATED APPLICATIONS

This patent application is based on and claims priority pursuant to 35 U.S.C. § 119(a) to Japanese Patent Application Nos. 2020-172875, filed on Oct. 13, 2020, 2021-042953, filed on Mar. 16, 2021, and 2021-163685, filed on Oct. 4, 2021, in the Japan Patent Office, the entire disclosures of which are hereby incorporated by reference herein.

BACKGROUND

Technical Field

Embodiments of the present disclosure relate to a communication system, a display apparatus, and a display control method.

Related Art

In various communication situations, communication using language information alone is sometimes insufficient for efficient communication in a short time. For example, in a meeting for a new project or idea, visual information is effective for communication.

For example, a technique is known according to which an illustration displayed in an illustration search result display area is selected on a minutes editing screen of a graphic recording system, and the selected illustration is pasted to the minutes of a meeting, whereby the minutes including the illustration is created. This enables a user to review efficiently the meeting by checking the minutes including the illustration.

SUMMARY

An embodiment of the present disclosure includes a communication system including circuitry. The circuitry receives an input of language information. The circuitry performs recognition on the input language information. The circuitry displays one or more images corresponding to the input language information on a display, based on a result of the recognition.

Another embodiment of the present disclosure includes s display apparatus including circuitry. The circuitry receives an input of language information. The circuitry performs recognition on the input language information. The circuitry displays one or more images corresponding to the input language information on a display, based on a result of the recognition.

Another embodiment of the present disclosure includes a display control method performed by a display apparatus. The method includes receiving an input of language information. The method includes performing recognition on the input language information. The method includes displaying one or more images corresponding to the input language information on a display, based on a result of the recognition.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 18 is a schematic diagram illustrating an example of a transition of a display screen displayed by the visual communication system, according to an embodiment of the present disclosure;

FIG. 24-1 is a diagram illustrating an example of details of a transition of a display screen displayed by the visual communication system, according to an embodiment of the present disclosure;

FIG. 24-2 is a diagram illustrating an example of details of a transition of a display screen displayed by the visual communication system, according to an embodiment of the present disclosure;

FIG. 24-3 is a diagram illustrating an example of details of a transition of a display screen displayed by the visual communication system, according to an embodiment of the present disclosure;

FIG. 34 is a diagram illustrating an image displayed by a drawing display unit in which an illustration corresponding to a gesture is drawn, according to a variation of an embodiment of the present disclosure.

Figure 1:
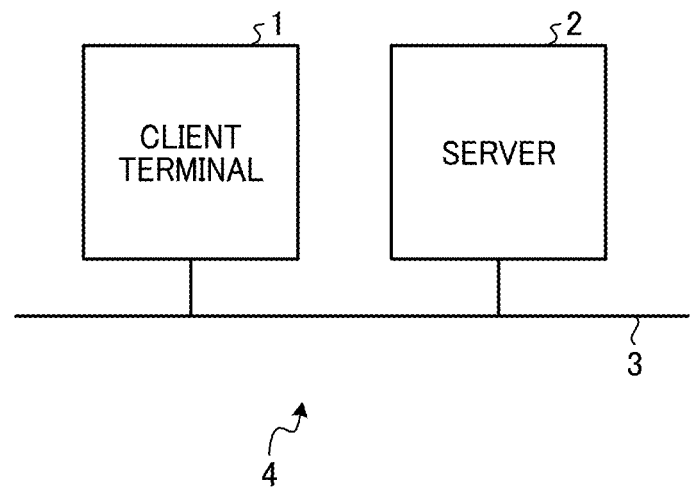
FIG. 1 is a schematic diagram illustrating a system configuration of a visual communication system, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A visual communication system according to an embodiment has a function of supporting communication. In various communication scenes, communication using language information alone is sometimes insufficient for efficient communication in a short time. For example, in a meeting for a new project or idea, visual information is effective for communication. Sketching a picture representing an idea by hand is one of ways for visualizing information. However, it is sometimes not easy to visualize a scene itself in one's mind from scratch. To address such an issue, a first technique may be adopted that converts language information into visual information, which can be easily handled by anyone.

However, the first technique of converting language information into visual information merely provides a search of illustrations prepared in advance, the search being triggered by a selection operation of language information. In the first technique, it often occurs that there is no illustration having an orientation or a combination that matches a scene to be communicated in one's mind, and information is not appropriately communicated. By increasing the number of illustrations prepared in advance, the probability that there is an illustration that matches the scene in one's mind increases. However, the time for selection increases as the number of illustrations increases. Further, when a plurality of pieces of language information are selected, illustrations are searched for each of the plurality of pieces of language information. As a result, illustrations may be displayed respectively for the plurality of pieces of language information. Thus, when the first technique is applied to a real-time communication, illustrations corresponding language information other than the currently spoken or currently input language information are displayed. Due to this, it is likely to take time to select a desired illustration. In other words, the first technique may not provide speedy information communication in communication such as a meeting.

To address such the issue, in one or more embodiments of the present disclosure, in a visual communication system, one or more thumbnail images as candidates for illustrations corresponding to language information are displayed as being switched speedily according to the change of the language information. This enables quick selection of an illustration corresponding to current language information and supports speedy information communication in communication scenes.

Specifically, the visual communication system converts language information into visual information that is editable as desired, whereby enabling accurate communication of a scene in one's mind speedily in communication scenes such as a meeting. The visual communication system analyzes language information such as speeches or characters that are input in communication scenes in real time, and at the same time displays one or more thumbnail images in a particular area as candidates of illustrations relating to the language information. The visual communication system includes first association information associating language information and thumbnail images with each other. In response to receiving language information, the visual communication system identifies one or more thumbnail images associated with the received language information in the first correspondence information and displays the identified one or more thumbnail images. The visual communication system further includes second association information associating a thumbnail image with an illustration with each other. When the illustration is a three-dimensional image, the thumbnail image is converted to a two-dimensional image. This enables the visual communication system to display the thumbnail image speedily, when compared with displaying the illustration. Each time language information from a user is received, the visual communication system switches the thumbnail image displayed on a display screen, whereby speedily updating the thumbnail image for display. This allows the user to select one or more desired thumbnail images close to a scene in the user's mind at the time of speaking or inputting characters without stopping communication by a conversation, etc. Three-dimensional illustration data associated with the selected thumbnail image is retrieved based on the second association information, and the identified three-dimensional illustration data is displayed. Thus, three-dimensional editing processing (three-dimensional movement, scaling, and rotation) can be performed on the three-dimensional illustration data. Further, the visual communication system converts (fixes) the three-dimensional illustration data on which three-dimensional editing processing can be performed into two-dimensional illustration data on which two-dimensional editing processing can be performed. Accordingly, the two-dimensional editing processing can be performed on the two-dimensional illustration data. Examples of the two-dimensional editing processing include, but not limited to, freely erasing a part of the two-dimensional illustration data, adding an object over at least a part of the two-dimensional illustration data, and coloring at least a part of the two-dimensional illustration data. The above-described speedy switching display of the thumbnail images triggered by the automatic recognition of the language information and the above-described two-stage editing processing enable a user to express a scene in the user's mind accurately and quickly in a real time communication. Thus, speedy and accurate communication is implemented.

More specifically, a visual communication system 4 has a configuration as illustrated in FIG. 1, for example. FIG. 1 is a schematic diagram illustrating an example of a system configuration of the visual communication system 4.

The visual communication system 4 includes a client terminal 1, a server 2, and a connection unit 3. The connection unit 3 communicably connects the client terminal 1 and the server 2 to each other.

Figure 2:
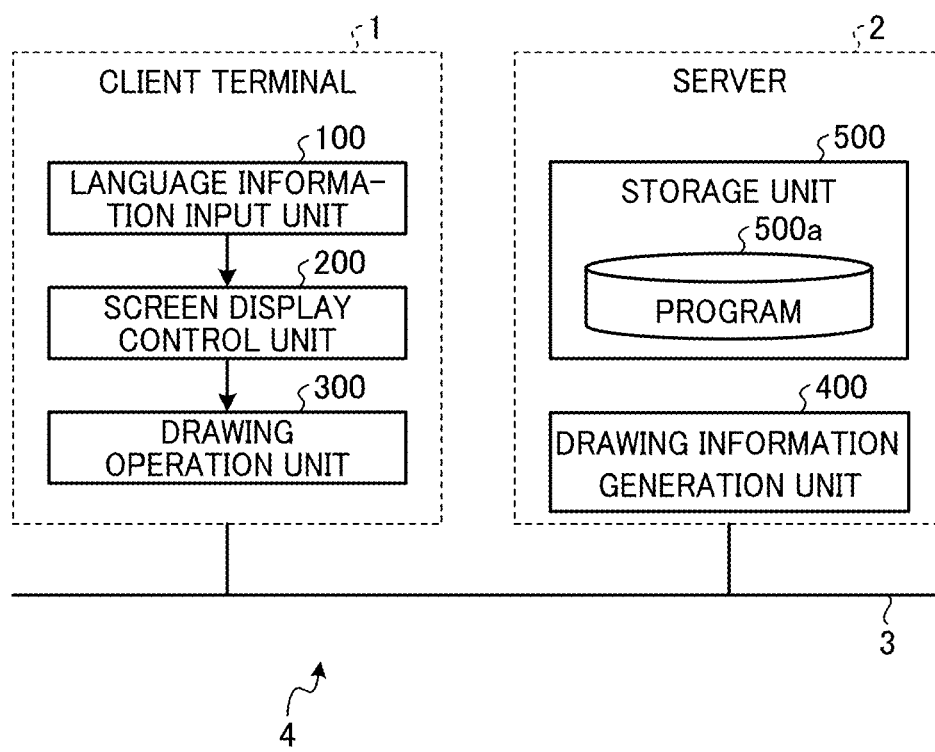
FIG. 2 is a block diagram illustrating a functional configuration of the visual communication system, according to an embodiment of the present disclosure.

FIG. 2 is a block diagram illustrating an example of a functional configuration of the visual communication system 4. The client terminal 1 includes a language information input unit 100, a screen display control unit 200, and a drawing operation unit 300. The server 2 includes a drawing information generation unit 400 and a storage unit 500. The storage unit 500 stores a program 500a.

In the visual communication system 4, in response to receiving an activation request from a user at the client terminal 1, the activation request is transmitted from the client terminal 1 to the server 2. The server 2 reads the program 500a from the storage unit 500 in response to the activation request. The visual communication system 4 configures functional units such as the language information input unit 100, the screen display control unit 200, and the drawing operation unit 300 in the client terminal 1, according to the program 500a, as illustrated in FIG. 2. Further, the visual communication system 4 configures functional units such as the drawing information generation unit 400 in the server 2 according to the program 500a.

In another example, the visual communication system 4 may configure the screen display control unit 200 and the drawing operation unit 300 of the client terminal 1 in the server 2 or another server. In still another example, the visual communication system 4 may have a configuration in which the client terminal 1 includes all the functional units including the language information input unit 100, the screen display control unit 200, the drawing operation unit 300, and the drawing information generation unit 400. In still another example, the visual communication system 4 may have a configuration in which the client terminal 1 includes some of a plurality of elements included in the screen display control unit 200 (e.g., a user interface and one or more elements close to the user interface), and the server 2 or another server includes the other elements. In substantially the same manner, the visual communication system 4 may have a configuration in which the client terminal 1 includes some of a plurality of elements included in the drawing operation unit 300 (e.g., a user interface and one or more elements close to the user interface), and the server 2 or another server includes the other elements.

The connection unit 3 is implemented by, for example, a wired communication line and/or a wireless communication line. In another example, the connection unit 3 is implemented by, for example, a so-called communication network or a communication cable. In still another example, the connection unit 3 is implemented by, for example, at least one of the Internet, a mobile communication network, or a local area network (LAN). The connection unit 3 includes a network by not only wired communications but also a network by wireless communications such as 3rd generation (3G), 4th generation (4G), 5th generation (5G), Wireless Fidelity (registered trademark) (Wi-Fi), Worldwide Interoperability for Microwave Access (WiMAX) or Long Term Evolution (LTE). When the program 500a is stored in the client terminal 1 and the functional units are configured to operate only in the client terminal 1, the connection unit 3 may be omitted.

The language information input unit 100 as language information input means of the client terminal 1 receives input of language information by a user. The screen display control unit 200 displays an image such as a character or an illustration on a display 506 (see FIG. 3). The drawing operation unit 300 receives a drawing operation by a user. The term "drawing" refers to not only handwriting but also a selection operation on the display 506 performed for drawing on the display 506. The drawing operation unit 300 of the client terminal 1 transmits a drawing operation request to the drawing information generation unit 400 of the server 2. In response to the drawing operation request, the drawing information generation unit 400 of the server 2 updates drawing information to change an appearance of a display image, and transmits the updated drawing information to the client terminal 1. The client terminal 1 receives the updated drawing information and displays an image corresponding to the updated drawing information on the display 506. Thus, a result of the drawing operation by the user is displayed on the display 506 of the client terminal 1.

Figure 3:
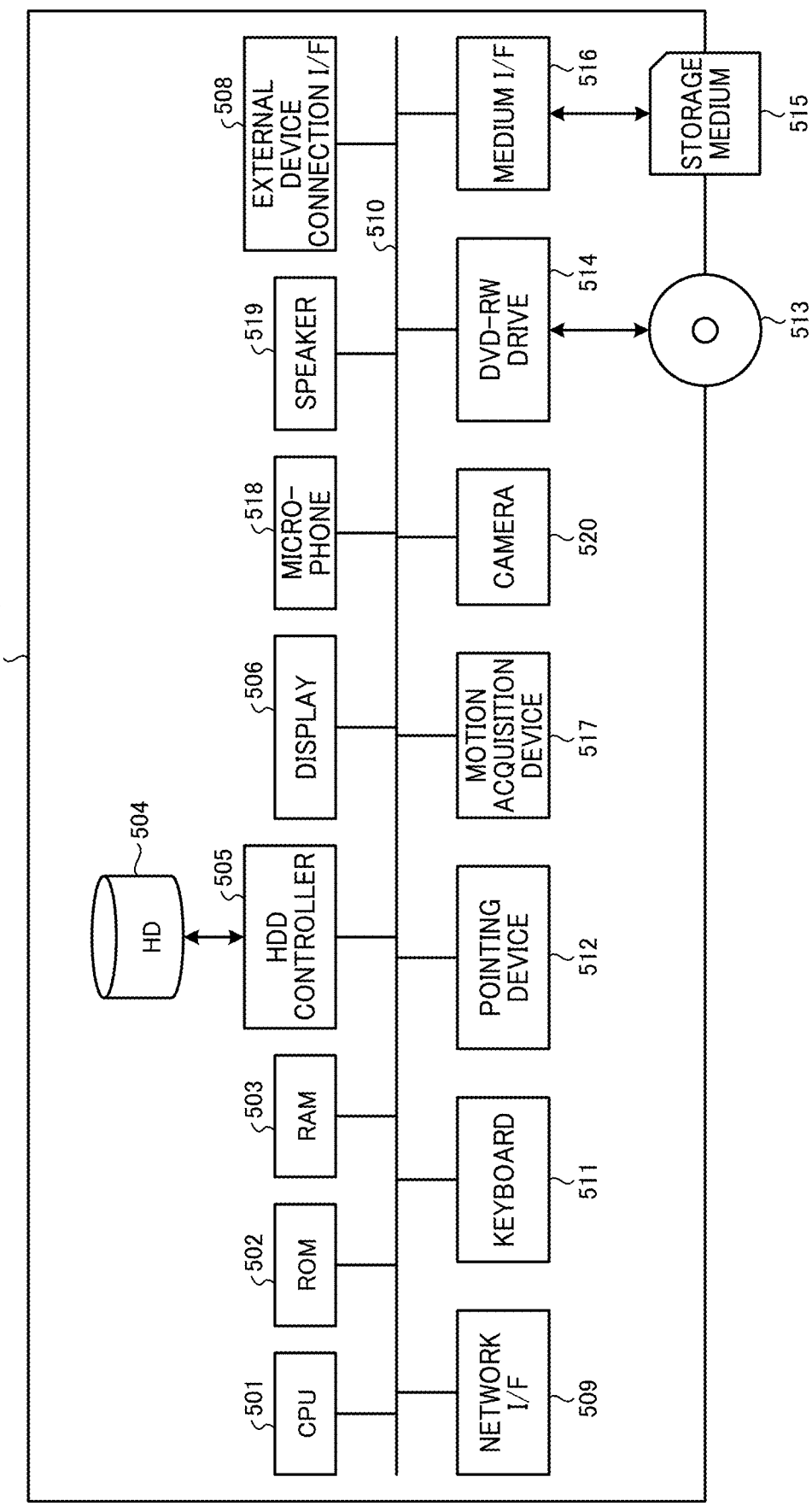
FIG. 3 is a block diagram illustrating a hardware configuration of a computer applied to the visual communication system, according to an embodiment of the present disclosure.

Each of the client terminal 1 and the server 2 is implemented by, for example, a computer 5 having a hardware configuration as illustrated in FIG. 3. FIG. 3 is a block diagram illustrating an example of a hardware configuration of the computer 5 applied to the visual communication system 4.

As illustrated in FIG. 3, the computer 5 includes a central processing unit (CPU) 501, a read only memory (ROM) 502, a random access memory (RAM) 503, a hard disc (HD) 504, a hard disc drive (HDD) controller 505, the display 506, an external device connection interface (I/F) 508, a network I/F 509, a bus line 510, a keyboard 511, a pointing device 512, a digital versatile disk-rewritable (DVD-RW) drive 514, a medium I/F 516, a motion acquisition device 517, a microphone 518, a speaker 519, and a camera 520.

The CPU 501 controls overall operation of the computer 5. The ROM 502 stores programs such as an initial program loader (IPL) to boot the CPU 501. The RAM 503 is used as a work area for the CPU 501. The HD 504 stores various data including the program 500a. The HDD controller 505 controls reading and writing of various data from and to the HD 504 under control of the CPU 501. The display 506 as display means displays various information such as a cursor, a menu, a window, a character, or an image. The external device connection I/F 508 is an interface that connects the computer 5 to various external devices. Examples of the external devices include, but are not limited to, a universal serial bus (USB) memory and a printer. The network I/F 509 is an interface that controls communication of data with an external device through the connection unit 3. The bus line 510 is, for example, an address bus or a data bus, which electrically connects the components illustrated in FIG. 3, such as the CPU 501.

The keyboard 511 includes a plurality of keys that allow a user to input characters, numerals, or various instructions. The keyboard 511 is an example of input means. The pointing device 512 allows a user to select or execute various instructions, select a target for processing, or move a cursor being displayed. The pointing device 512 is an example of input means. The DVD-RW drive 514 reads and writes various data from and to a DVD-RW 513, which is an example of a removable storage medium. The DVD-RW is merely one example of the removable storage medium. For example, a DVD-recordable (DVD-R) may be used as the removable storage medium. The medium I/F 516 controls reading and writing (storing) of data from and to a storage medium 515 such as a flash memory.

The motion acquisition device 517 is a circuit that detects a motion of a user and converts the motion into an electric signal. The motion acquisition device 517 is an example of input means. The motion of a user is detected by, for example, an optical sensor that detects reflection of light, a magnetic sensor attached to the user, a mechanical sensor, a system using a detection result by the magnetic sensor, a system of analyzing an image of the user, or a combination thereof.

The microphone 518 is a built-in circuit that converts sound into an electric signal. The speaker 519 is a built-in circuit that generates sound such as music or voice by converting an electric signal into physical vibration.

The camera 520 is an example of a built-in imaging device capable of capturing an object to obtain image data.

In the computer 5 applied to the server 2, the HD 504 corresponds to the storage unit 500 and stores the program 500a. In the computer 5 applied to the client terminal 1, the program 500a is downloaded from the server 2 via the connection unit 3 and stored in the HD 504. The CPU 501 reads the program 500a from the HD 504 and executes the program 500a, to expand the functional configuration as illustrated in FIG. 2 is expanded to the RAM 503 collectively at the time of compilation or sequentially according to a progress of processing. In the computer 5 applied to the server 2, the CPU 501 executes the program 500a to expand the functional configuration as illustrated in FIG. 2 to the RAM 503 collectively at the time of compilation or according to a progress of processing.

In the computer 5 applied to the server 2, components relating to a user interface can be omitted. In other words, at least one of the display 506, the keyboard 511, the pointing device 512, and the motion acquisition device 517 can be omitted.

The computer 5 is merely one example of each of the client terminal 1 and the server 2. Other examples of the client terminal 1 and the server 2 include an interactive white board (IWB), which is a white board having an electronic whiteboard function capable of mutual communication, an output apparatus such as a digital signage, a head up display (HUD) apparatus, and an industrial machine, a medical device, a networked home appliance, an automobile (connected car), a mobile phone, a smartphone, a tablet terminal, a game console, and a personal digital assistant (PDA).

Figure 4:
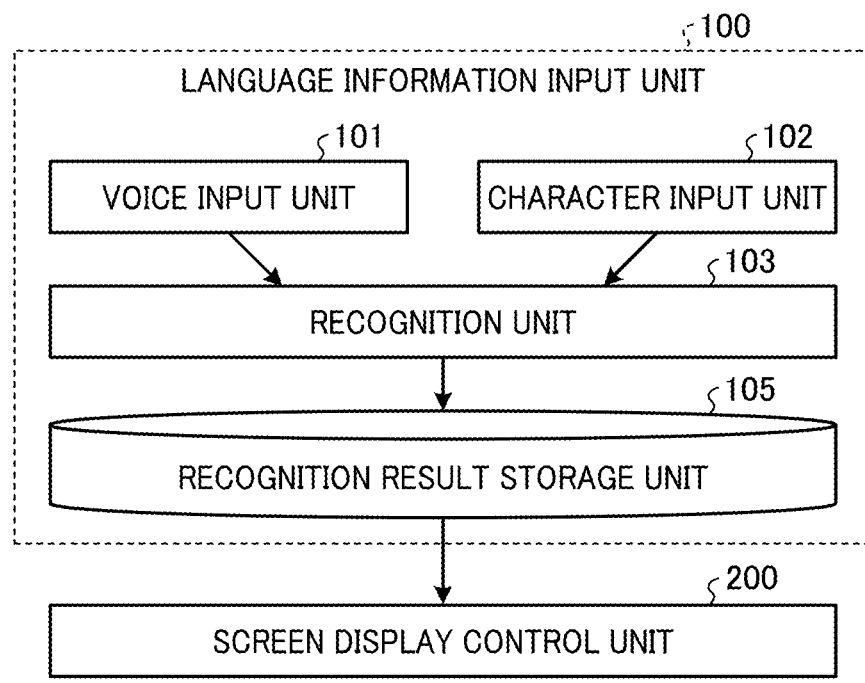
FIG. 4 is a block diagram illustrating a functional configuration of a language information input unit, according to an embodiment of the present disclosure.

The language information input unit 100 illustrated in FIG. 2 has a functional configuration as illustrated in FIG. 4, for example. FIG. 4 is a block diagram illustrating an example of the functional configuration of the language information input unit 100.

The language information input unit 100 includes a voice input unit 101, a character input unit 102, a recognition unit 103 as recognition means, and a recognition result storage unit 105. The above-described functional units are functions that are implemented by or that are caused to function by operating any of the components illustrated in FIG. 3 in cooperation with instructions of the CPU 501 according to the program expanded from the HD 504 to the RAM 503.

The voice input unit 101 receives, as language information, a voice signal obtained by converting a user's voice input through the microphone 518 or a voice signal received via the network I/F 509. The voice input unit 101 provides the received voice signal to the recognition unit 103.

The character input unit 102 receives, as language information, a character signal input by a user using the keyboard 511, the pointing device 512, or the motion acquisition device 517, or a character signal received via the network I/F 509. The character input unit 102 provides the character signal to the recognition unit 103. For example, characters are input to the character input unit 102 through typing on the keyboard 511 or by handwriting input using the pointing device 512 or the motion acquisition device 517.

In response to receiving the language information from the voice input unit 101 or the character input unit 102, the recognition unit 103 performs character information recognition on the language information. The recognition unit 103 stores a result of the character information recognition in the recognition result storage unit 105.

In response to receiving the voice signal from the voice input unit 101, the recognition unit 103 performs speech recognition processing on the voice signal, to convert the voice signal into character information. The recognition unit 103 has a template voice signal for each character. The recognition unit 103 performs matching processing using the template voice signal on the voice signal, to recognize a character for each sound based on a matching score obtained by the matching processing. Thus, the recognition unit 103 generates the character information as a recognition result for the voice signal.

In response to receiving the character signal from the character input unit 102, the recognition unit 103 generates character information as a recognition result for the character signal. In response to receiving character information through typing on the keyboard 541, the recognition unit 103 sets the character information as a recognition result. Upon receiving a handwritten character image drawn by the pointing device 512 or detected by the motion acquisition device 517, the recognition unit 103 performs text recognition processing on the handwritten character image, to convert the handwritten character image into character information. The recognition unit 103 has a template character image for each character. The recognition unit 103 performs matching processing using the template character image on the handwritten character image, to recognize a character for each handwritten character image based on a matching score obtained by the matching processing. Thus, the recognition unit 103 generates the character information as a recognition result for the handwritten character image. The above-described recognition is merely one example of recognition by the recognition unit 103. In another example, the recognition unit 103 generates a characteristic waveform pattern included in the input audio signal as a recognition result.

The recognition unit 103 transmits the recognition result stored in the recognition result storage unit 105 to the screen display control unit 200.

Figure 5:
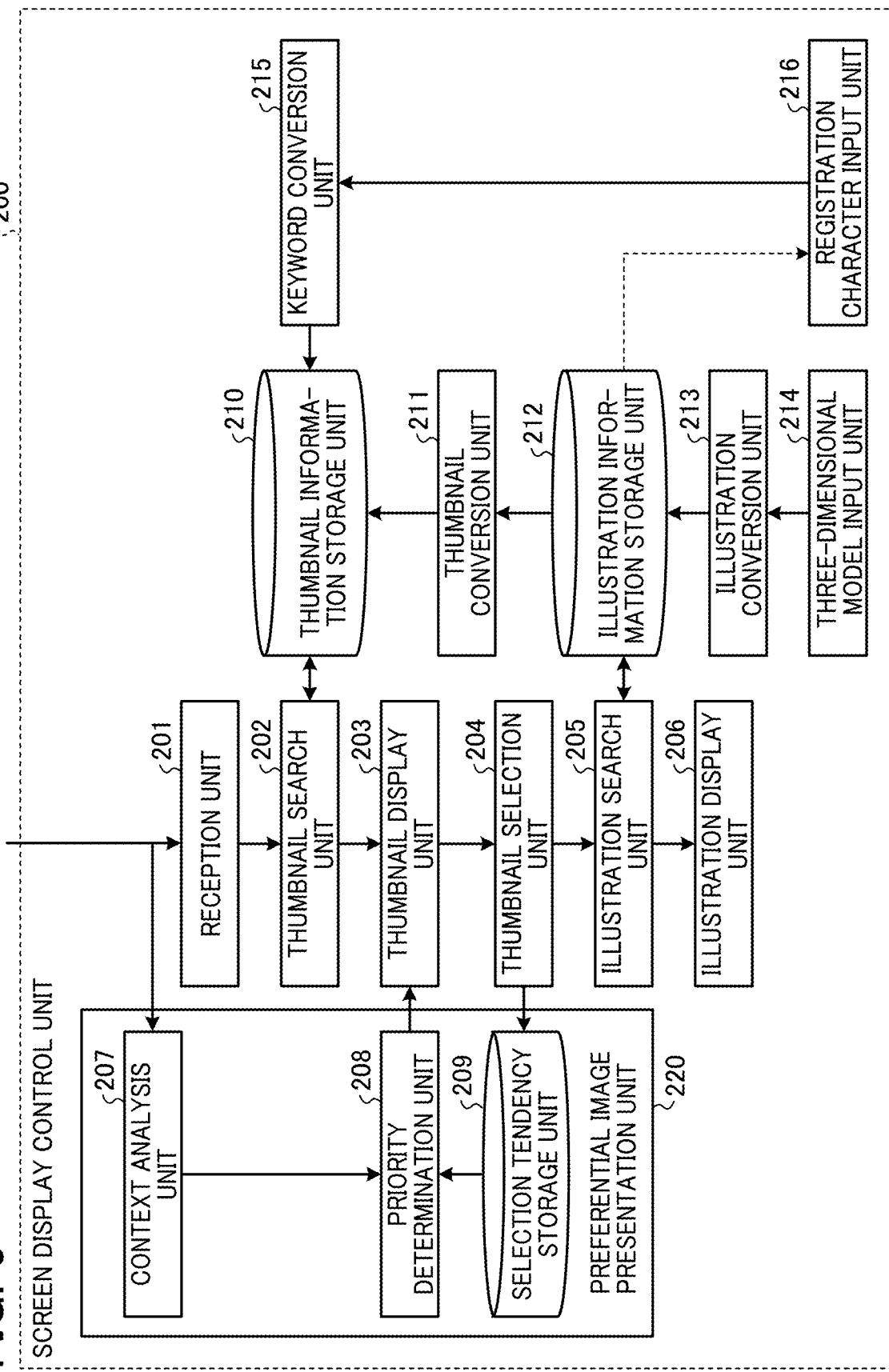
FIG. 5 is a block diagram illustrating a functional configuration of a screen display control unit according to an embodiment of the present disclosure.

The screen display control unit 200 illustrated in FIG. 2 has a functional configuration as illustrated in FIG. 5, for example. FIG. 5 is a block diagram illustrating an example of the functional configuration of the screen display control unit 200.

The screen display control unit 200 includes a thumbnail search unit 202 as first image search means, a thumbnail display unit 203 as first image display means, a thumbnail selection unit 204, an illustration search unit 205 as second image search means, an illustration display unit 206 as second image display means, a preferential image presentation unit 220 as preferential image presentation means, a thumbnail conversion unit 211, an illustration conversion unit 213, a three-dimensional model input unit 214, a keyword conversion unit 215, and a registration character input unit 216. The preferential image presentation unit 220 includes a context analysis unit 207, a priority determination unit 208, and a selection tendency storage unit 209.

These units are functions that are implemented by or that are caused to function by operating any of the components illustrated in FIG. 3 in cooperation with instructions of the CPU 501 according to the program 500a expanded from the HD 504 to the RAM 503.

The screen display control unit 200 further includes a thumbnail information storage unit 210 as first storage means and an illustration information storage unit 212 as second storage means. Each of these functional units is implemented by the ROM 502, the RAM 503, or the HD 504.

Figure 6:
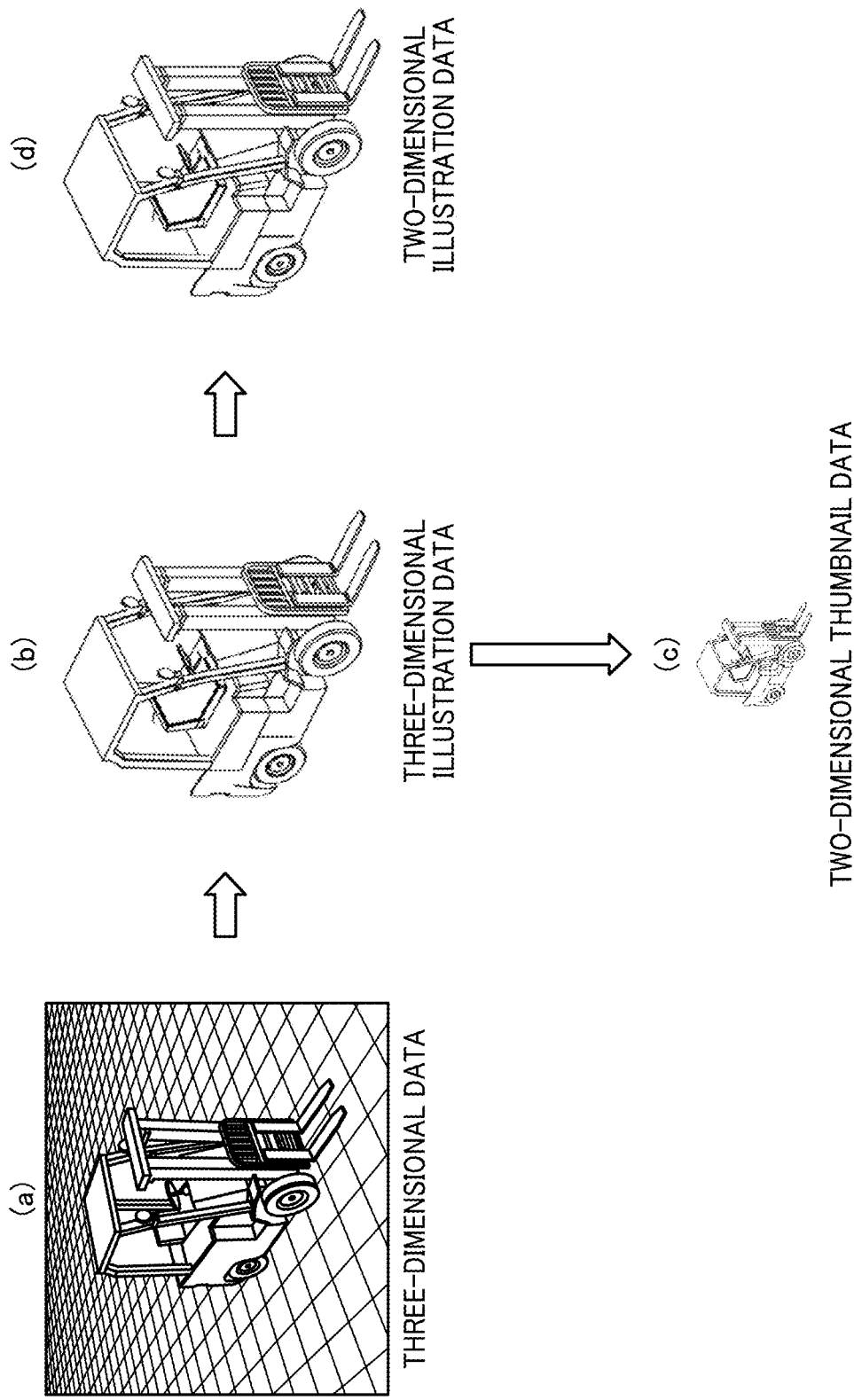
FIG. 6 is a data flow diagram illustrating a conversion of image data, according to an embodiment of the present disclosure.

A description is now given of data storage to the thumbnail information storage unit 210 and the illustration information storage unit 212 with reference to FIG. 5 and FIG. 6. FIG. 6 is a data flow diagram illustrating a conversion of image data.

The three-dimensional model input unit 214 receives an input of three-dimensional model data. The three-dimensional model data is, for example, polygon data as Illustration (a) of FIG. 6. The three-dimensional model data includes a plurality of spatial coordinates. The three-dimensional model data supports a three-dimensional image data format (e.g., an OBJ format). The three-dimensional model input unit 214 provides the three-dimensional model data to the illustration conversion unit 213.

The illustration conversion unit 213 converts the three-dimensional model data into three-dimensional illustration data. The three-dimensional illustration data is, for example, three-dimensional line drawing data as Illustration (b) of FIG. 6. The three-dimensional illustration data includes a plurality of spatial coordinates. The three-dimensional illustration data supports a three-dimensional image data format (e.g., an OBJ format). The illustration conversion unit 213 identifies three-dimensional positions of edges of a three-dimensional shape represented by the three-dimensional model data and connects the identified positions with the line drawing, to extract information of the line drawing from the three-dimensional model data and generate the three-dimensional illustration data. The illustration conversion unit 213 additionally stores the three-dimensional illustration data in the illustration information storage unit 212.

Figure 7:
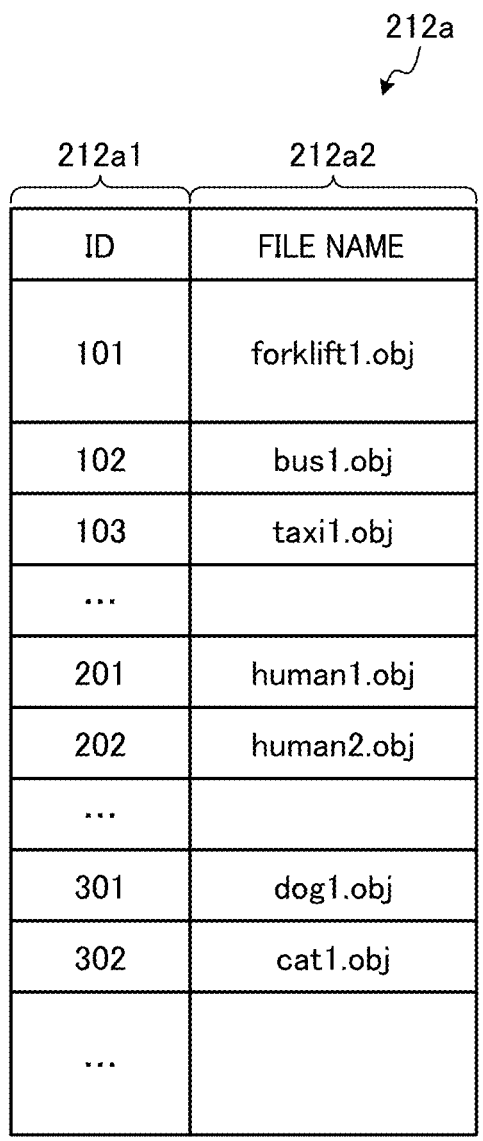
FIG. 7 is a table illustrating an example of data structure of an illustration information stored in an illustration information storage unit, according to an embodiment of the present disclosure.

As a result, illustration information 212a as illustrated in FIG. 7 is stored in the illustration information storage unit 212. FIG. 7 is a diagram illustrating an example of data structure of the illustration information 212a stored in the illustration information storage unit 212. The illustration information 212a associates, for each of one or more pieces of three-dimensional illustration data, three-dimensional illustration data with an identification information identifying the corresponding three-dimensional illustration data. For example, the illustration information 212a includes an identification information column 212a1 and an access information column 212a2. In the identification information column 212a1, information identifying each of the one or more pieces of three-dimensional illustration data is recorded. For example, an identifier (ID) number of each of the one or more pieces of the three-dimensional illustration data is recorded. In the access information column 212a2, information for accessing each of the one or more pieces of three-dimensional illustration data is recorded. For example, a file name of each of the one or more pieces of three-dimensional illustration data is recorded. The file name is one example of the information for accessing each of the one or more pieces of three-dimensional illustration data. In another example, information for accessing each of the one or more pieces of three-dimensional illustration data is address information on a network in which each of the one or more pieces of three-dimensional illustration data is stored.

The thumbnail conversion unit 211 obtains the three-dimensional illustration data from the illustration information storage unit 212 at the timing when the three-dimensional illustration data is added to the illustration information storage unit 212 or at certain intervals. Further, the thumbnail conversion unit 211 converts the obtained three-dimensional illustration data into two-dimensional thumbnail data. The two-dimensional thumbnail data is, for example, two-dimensional line drawing data as Illustration (C) of FIG. 6. The two-dimensional thumbnail data is line drawing data obtained by reducing the three-dimensional illustration data and converting the reduced three-dimensional illustration data to two-dimensional data. The two-dimensional thumbnail data supports a two-dimensional image data format (e.g., a BMP format). The two-dimensional thumbnail data is associated with the identification information of the three-dimensional illustration data. The thumbnail conversion unit 211 obtains a plurality of plane coordinates obtained by projecting a plurality of spatial coordinates included in the three-dimensional illustration data onto a predetermined plane, and reduces two-dimensional line drawing data corresponding to the obtained plurality of plane coordinates, to generate two-dimensional thumbnail data reduced and converted to two-dimensional data from the three-dimensional illustration data. The thumbnail conversion unit 211 additionally stores the two-dimensional thumbnail data in the thumbnail information storage unit 210 in association with the identification information of the three-dimensional illustration data.

Figure 8:
FIG. 8 is a table illustrating an example of data structure of a thumbnail information stored in a thumbnail information storage unit, according to an embodiment of the present disclosure.

As a result, thumbnail information 210*a* as illustrated in FIG. 8 is stored in the thumbnail information storage unit 210. FIG. 8 is a diagram illustrating an example of data structure of the thumbnail information 210*a* stored in the thumbnail information storage unit 210. The thumbnail information 210*a* associates, for each of one or more pieces of two-dimensional thumbnail data, a keyword, three-dimensional illustration data, and two-dimensional thumbnail data with each other. The thumbnail information 210*a* includes, as first association information, information associating a keyword with two-dimensional thumbnail data. As illustrated in FIG. 8, a plurality of keywords can be set for one two-dimensional thumbnail data. In addition, what is associated with two-dimensional thumbnail data as an example of an image is not limited to the keyword. For example, when the recognition unit 103 generates a characteristic waveform pattern included in a voice signal as a recognition result, two-dimensional thumbnail data is associated with information of the waveform pattern. The thumbnail information 210*a* further includes, as second association information, information associating two-dimensional thumbnail data with three-dimensional illustration data. For example, the thumbnail information 210*a* includes a keyword column 210*a*1, an identification information column 210*a*2, and an access information column 210*a*3. In the keyword column 210*a*1, a keyword for calling the two-dimensional thumbnail data is recorded. When no keyword is registered, the corresponding field is blank. In the identification information column 210*a*2, information identifying three-dimensional illustration data associated with each of the one or more pieces of two-dimensional thumbnail data is recorded. For example, an ID number of the three-dimensional illustration data is recorded. In the access information column 210*a*3, information for accessing each of the one or more pieces of two-dimensional thumbnail data is recorded. For example, a file name of each of the one or more pieces of two-dimensional thumbnail data is recorded. The file name is one example of the information for accessing each of the one or more pieces of two-dimensional thumbnail data. In another example, information for accessing each of the one or more pieces of two-dimensional thumbnail data is address information on a network in which each of the one or more pieces of two-dimensional thumbnail data is stored. Examples of the keyword include, but are not limited to, a word, a phonetic character, an ideographic character, a sentence, a number, and a combination thereof.

At the timing when three-dimensional illustration data is added to the illustration information storage unit 212 or at certain intervals, character information to be associated with the three-dimensional illustration data is input to the registration character input unit 216. The registration character input unit 216 receives the character information associated with the identification information of the three-dimensional illustration data. In one example, as indicated by a dotted arrow, the registration character input unit 216 acquires, from the illustration information storage unit 212, a plurality of pieces of identification information as candidates to be associated with the character information, the plurality of pieces of identification information respectively identifying a plurality of pieces of three-dimensional illustration data. In this case, any one or more pieces of identification information are selected from the plurality of pieces of identification information and input to the registration character input unit 216. The registration character input unit 216 provides the character information associated with the identification information of the three-dimensional illustration data to the keyword conversion unit 215.

In response to receiving the character information associated with the identification information of the three-dimensional illustration data, the keyword conversion unit 215 accesses the thumbnail information storage unit 210, to additionally stores the received character information in a field in the keyword column 210*a*1 corresponding to the identification information of the three-dimensional illustration data.

Thus, in the thumbnail information 210*a* stored in the thumbnail information storage unit 210, one or more keywords are additionally stored in the keyword column 210*a*1 as illustrated in FIG. 8.

The data size of the two-dimensional thumbnail data is significantly smaller than the data size of the three-dimensional illustration data. The use of thumbnails, which data size is smaller, at the time of searching for an illustration based on the language information minimizes a time lag that occurs at the time of calling images.

A description now given of storing data in the selection tendency storage unit 209 with reference to FIG. 5. The context analysis unit 207 analyzes context based on the recognition result of the language information provided from the language information input unit 100. Further, selection information at the thumbnail selection unit 204 is stored in the selection tendency storage unit 209 as a user's selection tendency. The priority determination unit 208 determines a priority order in which the two-dimensional thumbnail data is to be displayed, based on a result of the analysis by the context analysis unit 207 and a result of the storage in the selection tendency storage unit 209. Further, the priority determination unit 208 provides the determined priority order to the thumbnail display unit 203. The thumbnail display unit 203 causes the display 506 to display the two-dimensional thumbnail data in descending order of priority based on the result of the determination by the priority determination unit 208.

In one example, the priority order may be determined so that different languages as the language information are supported. The priority determination unit 208 may determine the priority such that a thumbnail that appears changes according to the type of language. For example, when a word "school" in the African language is detected, the priority determination unit 208 determines the priority order so that an illustration representing a school often seen in Africa is preferentially displayed instead of an illustration of a general school in Japan.

A description is now given of how an illustration is displayed, with reference to FIG. 5. The thumbnail search unit 202 as the first image search means searches for two-dimensional thumbnail data based on the recognition result of the language information. The thumbnail search unit 202 accesses the thumbnail information storage unit 210 to search the thumbnail information 210a using a keyword included in character information as the recognition result of the language information as a search keyword. Thus, the thumbnail search unit 202 retrieves, as a search result, one or more pieces of two-dimensional thumbnail data corresponding to the keyword and identification information of three-dimensional illustration data associated the one or more pieces of two-dimensional thumbnail data. Further, the thumbnail search unit 202 provides the search result to the thumbnail display unit 203. The thumbnail display unit 203 as the first image display means provides the retrieved one or more pieces of two-dimensional thumbnail data to the drawing information generation unit 400 (see FIG. 2) via the connection unit 3. In response, the drawing information generation unit 400 controls the display 506 of the client terminal 1 to display the retrieved one or more two-dimensional thumbnail data at a particular position. Thus, the thumbnail display unit 203 as the first image display means displays an image corresponding to input language information on display means for displaying an image based on the recognition result by the recognition unit 103. The thumbnail selection unit 204 as selection means selects two-dimensional thumbnail data from the one or more pieces of two-dimensional thumbnail data displayed on the display 506 in response to a selection operation by the user. Examples of the selection operation by the user includes, but are not limited to, an operation of selecting a desired two-dimensional thumbnail data from the one or more pieces of two-dimensional thumbnail data displayed on the display 506 using the pointing device. The thumbnail selection unit 204 provides the identification information of three-dimensional illustration data associated with the selected two-dimensional thumbnail data to the illustration search unit 205 as second image search means. The illustration search unit 205 searches for three-dimensional illustration data based on the identification information of three-dimensional illustration data. The illustration search unit 205 accesses the illustration information storage unit 212, to retrieve three-dimensional illustration data corresponding to the identification information as a search result, and provides the retrieved three-dimensional illustration data to the illustration display unit 206. The illustration display unit 206 as the second image display means provides the retrieved three-dimensional illustration data to the drawing information generation unit 400 (see FIG. 2) via the connection unit 3. In response, the drawing information generation unit 400 controls the display 506 of the client terminal 1 to display the retrieved three-dimensional illustration data.

In another example, the conversion into thumbnail data is omitted. In this case, three-dimensional illustration data is displayed as a thumbnail. The detail of this case is described below.

Figure 9:
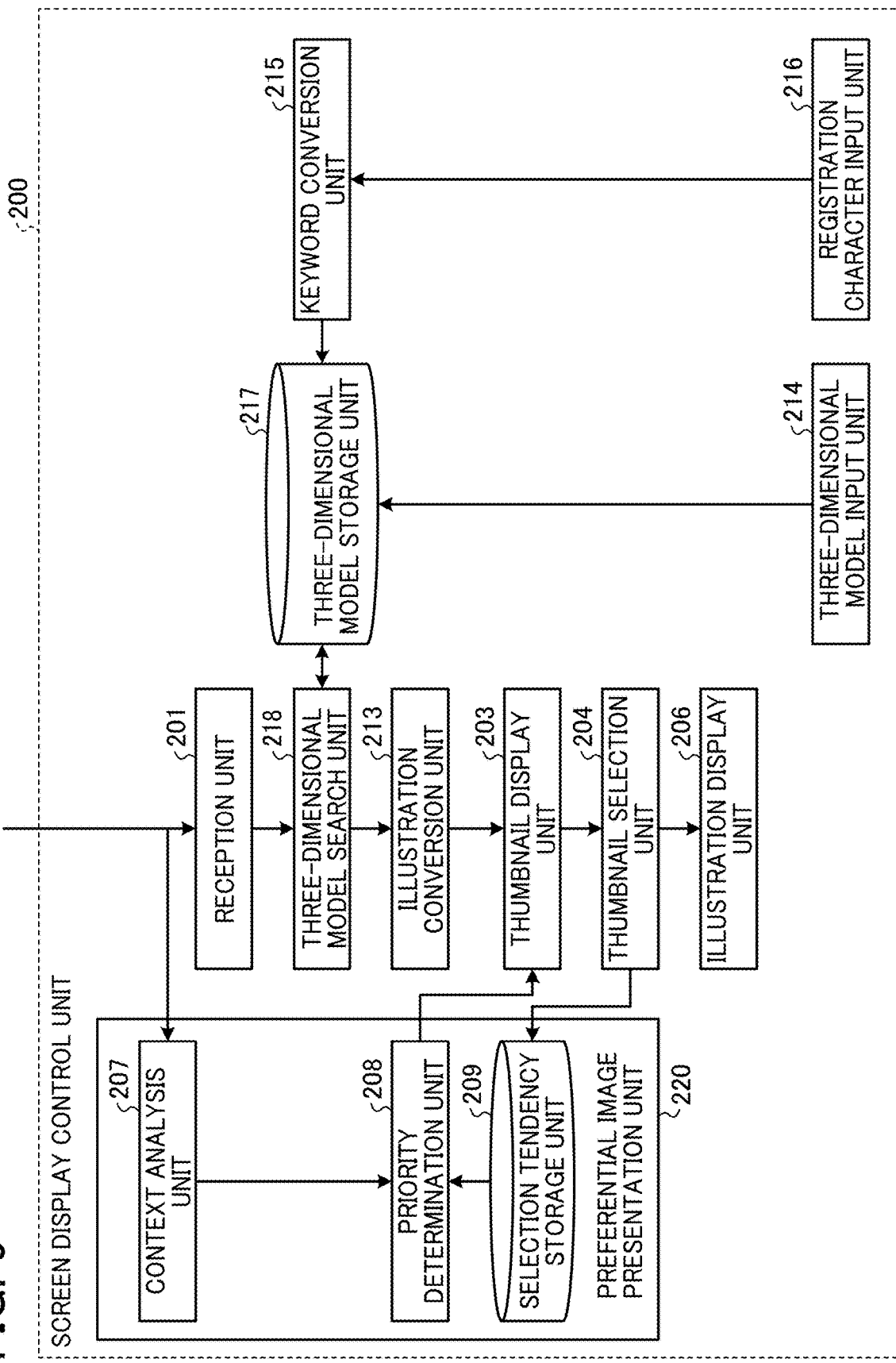
FIG. 9 is a block diagram illustrating a variation of a functional configuration of the screen display control unit, according to an embodiment of the present disclosure.

A description now given of storing data in a three-dimensional model storage unit 217 as the first storage means, with reference to FIG. 9 and FIG. 6.

As illustrated in FIG. 9, in a case in which three-dimensional illustration data is displayed as a thumbnail, the illustration search unit 205, the thumbnail conversion unit 211, and the illustration information storage unit 212 illustrated in FIG. 5 are omitted from the screen display control unit 200. Further, as illustrated in FIG. 9, the screen display control unit 200 includes the three-dimensional model storage unit 217 instead of the thumbnail information storage unit 210, and includes a three-dimensional model search unit 218 instead of the thumbnail search unit 202.

The three-dimensional model input unit 214 receives an input of three-dimensional model data. The three-dimensional model data is, for example, polygon data as Illustration (a) of FIG. 6. The three-dimensional model data includes a plurality of spatial coordinates. The three-dimensional model data supports a three-dimensional image data format (e.g., an OBJ format). The three-dimensional model input unit 214 provides the three-dimensional model data to the three-dimensional model storage unit 217.

At the timing when three-dimensional model data is added to the three-dimensional model storage unit 217 or at certain intervals, character information to be associated with the three-dimensional model data is input to the registration character input unit 216. The registration character input unit 216 receives the character information associated with the identification information of the three-dimensional model data.

In response to receiving the character information associated with the identification information of the three-dimensional model data, the keyword conversion unit 215 accesses the three-dimensional model storage unit 217, to additionally stores the received character information in a field in a keyword column 217a1 corresponding to the identification information of the three-dimensional model data.

Figure 10:
FIG. 10 is a table illustrating an example of data structure of the thumbnail information stored in the thumbnail information storage unit, according to an embodiment of the present disclosure.

As a result, three-dimensional model information 217a as illustrated in FIG. 10 is stored in the three-dimensional model storage unit 217. FIG. 10 is a diagram illustrating an example of data structure of the three-dimensional model information 217a stored in the three-dimensional model storage unit 217. The three-dimensional model information 217a includes information associating a keyword with three-dimensional model data. As illustrated in FIG. 10, a plurality of keywords can be set for one three-dimensional model data. In addition, what is associated with three-dimensional model as an example of an image is not limited to the keyword. For example, when the recognition unit 103 generates a characteristic waveform pattern included in a voice signal as a recognition result, two-dimensional thumbnail data is associated with information of the waveform pattern.

For example, the three-dimensional model information 217a includes a keyword column 217a1, an identification information column 217a2, and an access information column 217a3. In the keyword column 217a1, a keyword for calling the three-dimensional model data is recorded. When no keyword is registered, the corresponding field is blank. In the identification information column 217a2, information identifying each of the one or more pieces of three-dimensional model data is recorded. For example, an identifier (ID) number of each of the one or more pieces of the three-dimensional model data is recorded. In the access information column 217a3, information for accessing each of the one or more pieces of three-dimensional model data is recorded. For example, a file name of each of the one or more pieces of three-dimensional model data is recorded. The file name is one example of the information for accessing each of the one or more pieces of three-dimensional model data. In another example, information for accessing each of the one or more pieces of three-dimensional illustration data is an address on a network in which each of the one or more pieces of three-dimensional model data is stored.

A description is now given of how an illustration is displayed. The three-dimensional model search unit 218 searches for three-dimensional model data based on the recognition result of the language information. The three-dimensional model search unit 218 accesses the three-dimensional model storage unit 217 to search the three-dimensional model information 217a using a keyword included in character information as the recognition result of the language information as a search keyword. Thus, the three-dimensional model search unit 218 retrieves, as a search result, one or more pieces of three-dimensional model data corresponding to the character information (e.g., the keyword). Further, the three-dimensional model search unit 218 provides the search result to the illustration conversion unit 213. The illustration conversion unit 213 converts the three-dimensional model data into three-dimensional illustration data. The three-dimensional illustration data is, for example, three-dimensional line drawing data as Illustration (b) of FIG. 6. The three-dimensional illustration data includes a plurality of spatial coordinates. The three-dimensional illustration data supports a three-dimensional image data format (e.g., an OBJ format). The illustration conversion unit 213 identifies three-dimensional positions of edges of a three-dimensional shape represented by the three-dimensional model data and connects the identified three-dimensional positions with a line drawing, to extract information of the line drawing from the three-dimensional model data and generate the three-dimensional illustration data.

The thumbnail display unit 203 as the first image display means provides the generated three-dimensional illustration data to the drawing information generation unit 400 (see FIG. 2) via the connection unit 3. In response, the drawing information generation unit 400 controls the display 506 of the client terminal 1 to display the three-dimensional illustration data at a particular position. Thus, the thumbnail display unit 203 as the first image display means displays an image corresponding to input language information on display means for displaying an image based on the recognition result by the recognition unit 103. The first display control means may display the image as the search result as it is without performing illustration conversion by the illustration conversion unit 213. An image of three-dimensional model data and an image of three-dimensional illustration data, which obtained by converting the three-dimensional model data to an illustration are also an image corresponding to the input language information. The thumbnail selection unit 204 as selection means selects three-dimensional illustration data from one or more pieces of three-dimensional illustration data displayed on the display 506 in response to a selection operation by the user. Examples of the selection operation by the user includes, but are not limited to, an operation of selecting a desired three-dimensional illustration data from the one or more pieces of three-dimensional illustration data displayed on the display 506 using the pointing device. The thumbnail selection unit 204 provides the selected three-dimensional illustration data to the illustration display unit 206. The illustration display unit 206 as the second image display means provides the retrieved three-dimensional illustration data to the drawing information generation unit 400 (see FIG. 2) via the connection unit 3. In response, the drawing information generation unit 400 controls the display 506 of the client terminal 1 to display the retrieved three-dimensional illustration data.

What is to be searched by the three-dimensional model search unit 218 as the first image search unit is an image of any type. Examples of the image include, but are not limited to, a still image, a moving image, an illustration, a photograph, a two-dimensional illustration, a three-dimensional illustration, an animation, and a stereoscopic image.

What is to be displayed by the thumbnail display unit 203 as the first image display means and the illustration display unit 206 as the second image display means is also an image of any type. Examples of the image include, but are not limited to, a still image, a moving image, an illustration, a photograph, a two-dimensional illustration, a three-dimensional illustration, an animation, and a stereoscopic image.

Although in the above-description, the three-dimensional model storage unit 217 as the first storage means stores the three-dimensional model information 217a, in another example, any image information can be stored. Examples of the image information include, but are not limited to, a still image, a moving image, an illustration, a photograph, a two-dimensional illustration, a three-dimensional illustration, an animation, and a stereoscopic image.

A description is now given of an example in which the preferential image presentation unit 220 presents a preferential image based on prediction by machine learning.

Figure 11:
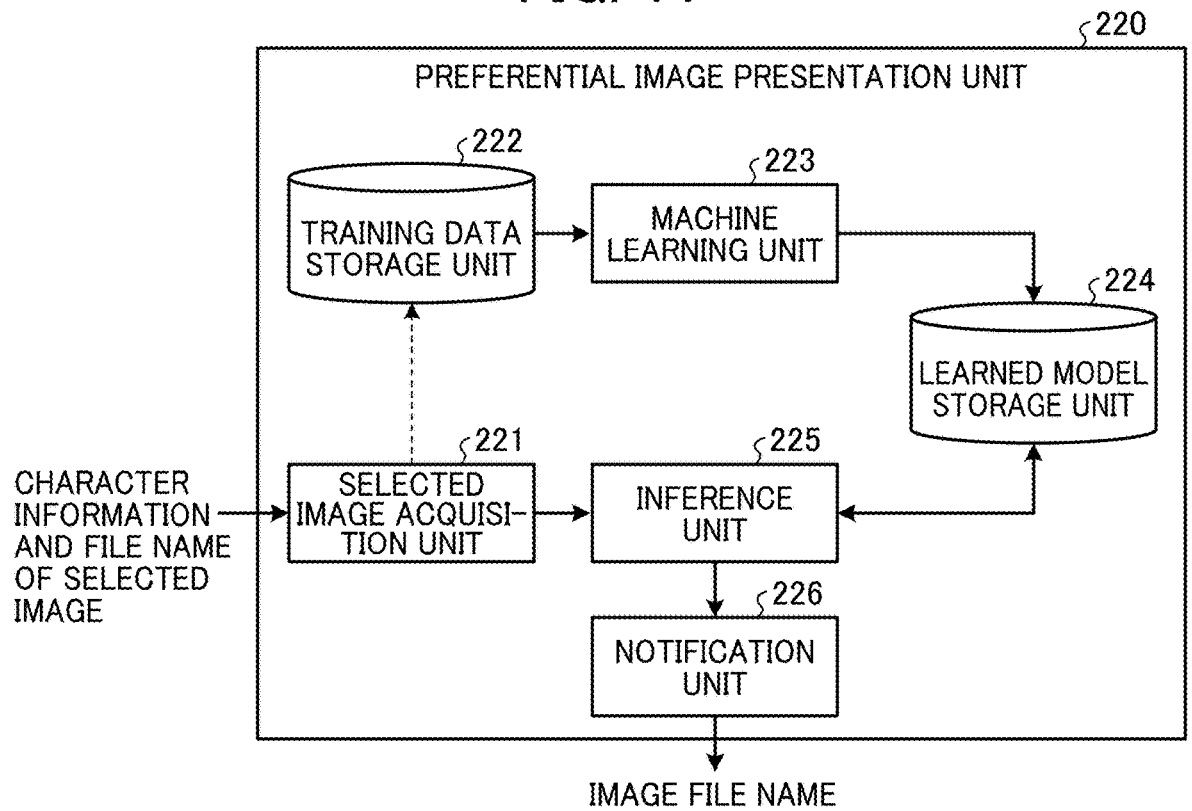
FIG. 11 is a block diagram illustrating a functional configuration of a preferential image presentation unit, according to an embodiment of the present disclosure.

Functional Configuration:

FIG. 11 is a block diagram illustrating an example of a functional configuration of the preferential image presentation unit 220, according to embodiments. As illustrated in FIG. 11, the preferential image presentation unit 220 includes a selected image acquisition unit 221, a training data storage unit 222, a machine learning unit 223, a learned model storage unit 224, an inference unit 225, and a notification unit 226. In the following, each of these functional units is described.

The selected image acquisition unit 221 acquires character information and selected image information, e.g., a thumbnail image, from the thumbnail selection unit 204.

Learning Phase:

Training data for machine learning is stored in the training data storage unit 222. The training data in the training data storage unit 222 includes character information that the selected image acquisition unit 221 acquires for a certain time period and data indicating a selected image, e.g., an image file name. The training data including multiple sets of character information and image file names are stored in the training data storage unit 222.

The machine learning unit 223 generates a learned model for deriving image information to be selected next from the received selected image data. Specifically, the machine learning unit 223 performs machine learning using training data including the received character information as input data and an image selected in response to receiving the character information as output data, to generate the learned model. The machine learning unit 223 stores the generated learned model in the learned model storage unit 224.

The learned model generated by the machine learning unit 223 is stored in the learned model storage unit 224.

Inference Phase:

The inference unit 225 acquires an image that is currently being selected image and infers an image to be selected next.

Specifically, the inference unit 225 acquires the character information and information identifying the selected image from the selected image acquisition unit 221. Examples of the information identifying the selected image include, but are not limited to, an image file name. Further, the inference unit 225 inputs the character information to the learned model in the learned model storage unit 224, to output image information (e.g., an image file name) to be selected next.

The notification unit 226 transmits, to the thumbnail display unit 203, information on the image (e.g., the image file name) to be selected next, output from the inference unit 225, as an image to be preferentially displayed.

In the above-described learning phase, the machine learning unit 223 may acquire and learn user information such as a user's login ID used when the user logs in to the visual communication system 4, in addition to the character information. In this case, the machine learning unit 223 further learns an image according to a user who inputs the language information.

Figure 12:
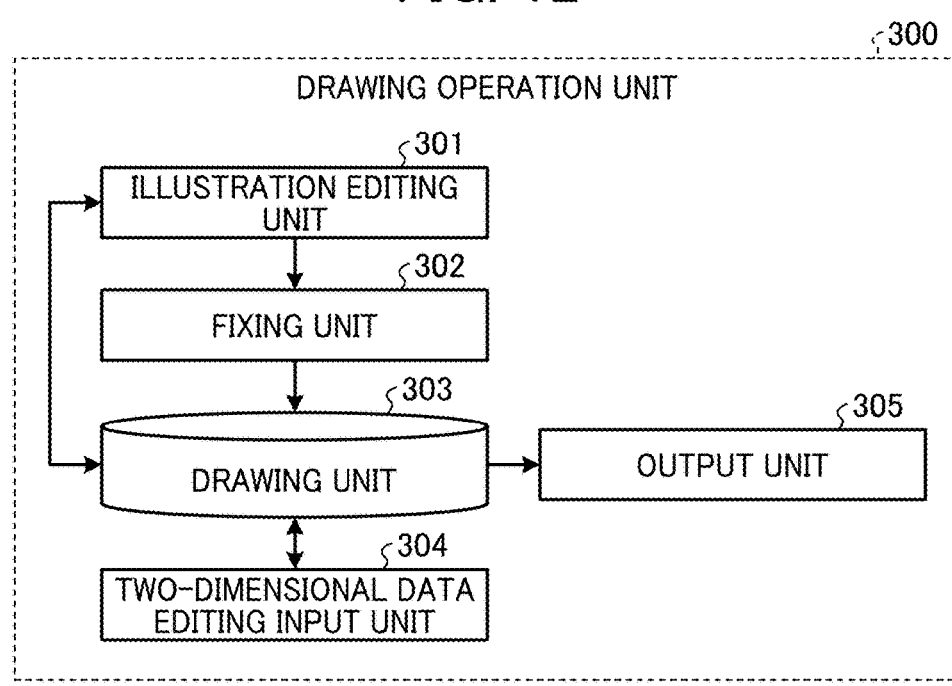
FIG. 12 is a block diagram illustrating a functional configuration of a drawing operation unit, according to an embodiment of the present disclosure.

The drawing operation unit 300 illustrated in FIG. 2 has a functional configuration as illustrated in FIG. 12, for example. FIG. 12 is a block diagram illustrating an example of the functional configuration of the drawing operation unit 300.

The drawing operation unit 300 includes an illustration editing unit 301, a fixing unit 302, a drawing unit 303, a two-dimensional data editing input unit 304, and an output unit 305.

The illustration editing unit 301 as first editing means (three-dimensional illustration data editing input means) receives three-dimensional illustration data from the screen display control unit 200 and performs three-dimensional editing processing on the received three-dimensional illustration data. In the three-dimensional editing processing, the illustration editing unit 301 receives, for example, a three-dimensional rotation operation, a three-dimensional movement operation, a three-dimensional enlargement operation, and a three-dimensional reduction operation by the user. Further, the illustration editing unit 301 provides operation requests of the above operations to the drawing information generation unit 400 (see FIG. 2) via the drawing unit 303, the output unit 305, and the connection unit 3. The three-dimensional rotation operation is an operation according to which a plurality of spatial coordinates included in three-dimensional illustration data are changed so as to be three-dimensionally rotated around a predetermined axis while maintaining the relative positions of the plurality of spatial coordinates. The three-dimensional enlargement operation is an operation according to which a plurality of spatial coordinates included in three-dimensional illustration data are changed so that the plurality of spatial coordinates radially moves away from a predetermined point at equal distance ratios. The three-dimensional reduction operation is an operation according to which a plurality of spatial coordinates included in three-dimensional illustration data are changed so that the plurality of spatial coordinates radially moves closer to a predetermined point at equal distance ratios. In response to the above operations, the drawing information generation unit 400 changes an appearance of three-dimensional illustration data in the drawing unit 303 of the client terminal 1. Thus, the position, size, and/or orientation of three-dimensional illustration data on the display 506 of the client terminal 1 is three-dimensionally changed.

The fixing unit 302 as conversion means converts (fixes) three-dimensional illustration data on which the three-dimensional editing processing can be performed into two-dimensional illustration data on which two-dimensional editing processing can be performed according to a predetermined operation. Examples of the predetermined operation include, but are not limited to, an operation according to which two-dimensional editing processing is activated, more specifically, an operation according to which a state of the three-dimensional illustration data transitions to a state in which two-dimensional editing processing can be performed. The two-dimensional illustration data is two-dimensional line drawing data as illustrated in Illustration (d) of FIG. 6. The two-dimensional illustration data is line drawing data obtained by converting three-dimensional illustration data on which the three-dimensional editing processing has been performed to two-dimensional data. The two-dimensional illustration data supports a two-dimensional image data format (e.g., an BMP format). The fixing unit 302 obtains a plurality of plane coordinates obtained by projecting a plurality of spatial coordinates included in the three-dimensional illustration data on a plane corresponding to a screen of the display 506, and generates two-dimensional line drawing data corresponding to the obtained plurality of plane coordinates. Thus, the fixing unit 302 converts the three-dimensional illustration data into the two-dimensional illustration data and fixes the two-dimensional illustration data in the drawing unit 303.

The two-dimensional data editing input unit 304 as second editing means (two-dimensional data editing input means) performs two-dimensional editing processing on the two-dimensional illustration data. In the two-dimensional editing processing, the two-dimensional data editing input unit 304 receives, for example, a two-dimensional rotation operation, a two-dimensional movement operation, a two-dimensional enlargement operation, a two-dimensional reduction operation, an operation of erasing a part, an operation of adding a handwritten line drawing, and an operation of coloring by the user. Further, the two-dimensional data editing input unit 304 provides operation requests of the above operations to the drawing information generation unit 400 (see FIG. 2) via the drawing unit 303, the output unit 305, and the connection unit 3. The two-dimensional rotation operation is an operation according to which a plurality of plane coordinates included in two-dimensional illustration data are changed so as to be two-dimensionally rotated around a predetermined point while maintaining the relative positions of the plurality of spatial coordinates. The two-dimensional enlargement operation is an operation according to which a plurality of plane coordinates included in two-dimensional illustration data are changed so that the plurality of plane coordinates radially moves away from a predetermined point at equal distance ratios. The two-dimensional reduction operation is an operation according to which a plurality of plane coordinates included in two-dimensional illustration data are changed so that the plurality of plane coordinates radially moves closer to a predetermined point at equal distance ratios. The operation of deleting a part is an operation according to which a part of a plurality of plane coordinates included in two-dimensional illustration data is deleted. The operation of adding the handwritten line drawing is an operation according to which a plurality of plane coordinates corresponding to a handwritten line drawing is added to a plurality of plane coordinates included in two-dimensional illustration data. The operation of coloring is an operation according to which a plurality of plane coordinates associated with a certain color attribute is added to a plurality of plane coordinates included in two-dimensional illustration data. In response to the above operations, the drawing information generation unit 400 changes an appearance of two-dimensional illustration data in the drawing unit 303 of the client terminal 1. Thus, the position, size, and/or orientation of two-dimensional illustration data on the display 506 of the client terminal 1 is two-dimensionally changed. Further, a part of two-dimensional illustration data is erased, a handwritten line drawing is added to two-dimensional illustration data, and/or two-dimensional illustration data is colored.

An input to the drawing unit 303 using a mouse, a user's finger, a stylus pen, a user's gesture, or the like are also available. The output unit 305 outputs information of the drawing unit 303 to the drawing information generation unit 400. In response, the drawing information generation unit 400 generates drawing information of a drawing to which the line drawing or the like input by handwriting in the drawing unit 303 of the client terminal 1 is added. Thus, for example, a handwritten line drawing is displayed on the display 506 of the client terminal 1.

The above-described functional units are functions that are implemented by or that are caused to function by operating any of the components illustrated in FIG. 3 in cooperation with instructions of the CPU 501 according to the program expanded from the HD 504 to the RAM 503.

Figure 13:
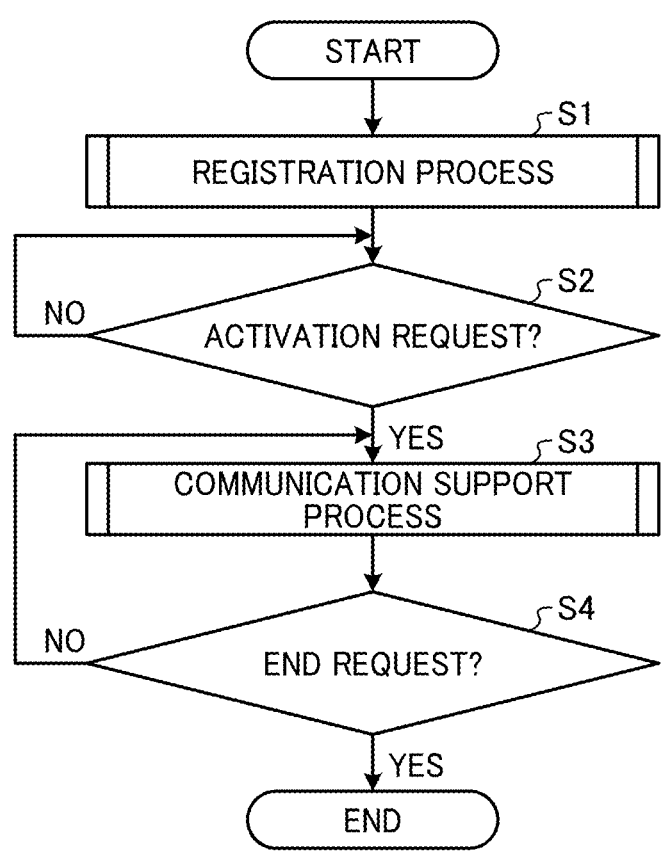
FIG. 13 is a flowchart illustrating an operation performed by the visual communication system, according to an embodiment of the present disclosure.

A description is now given of an operation performed by the visual communication system 4, with reference to FIG. 13. FIG. 13 is a flowchart illustrating an operation performed by the visual communication system 4.

The visual communication system 4 performs, as preparation for supporting communication, a registration process (S1) of registering certain information. Thereafter, the visual communication system 4 waits until an activation request from a user is input (No in S2). In response to an activation request from the user (Yes in S2), the visual communication system 4 activates the program 500a and starts a communication support process (S3). The visual communication system 4 continuously performs the communication support process (S3) until an end request is input from the user (No in S4). The visual communication system 4 ends the operation in response to receiving an end request from the user (Yes in S4).

Figure 14:
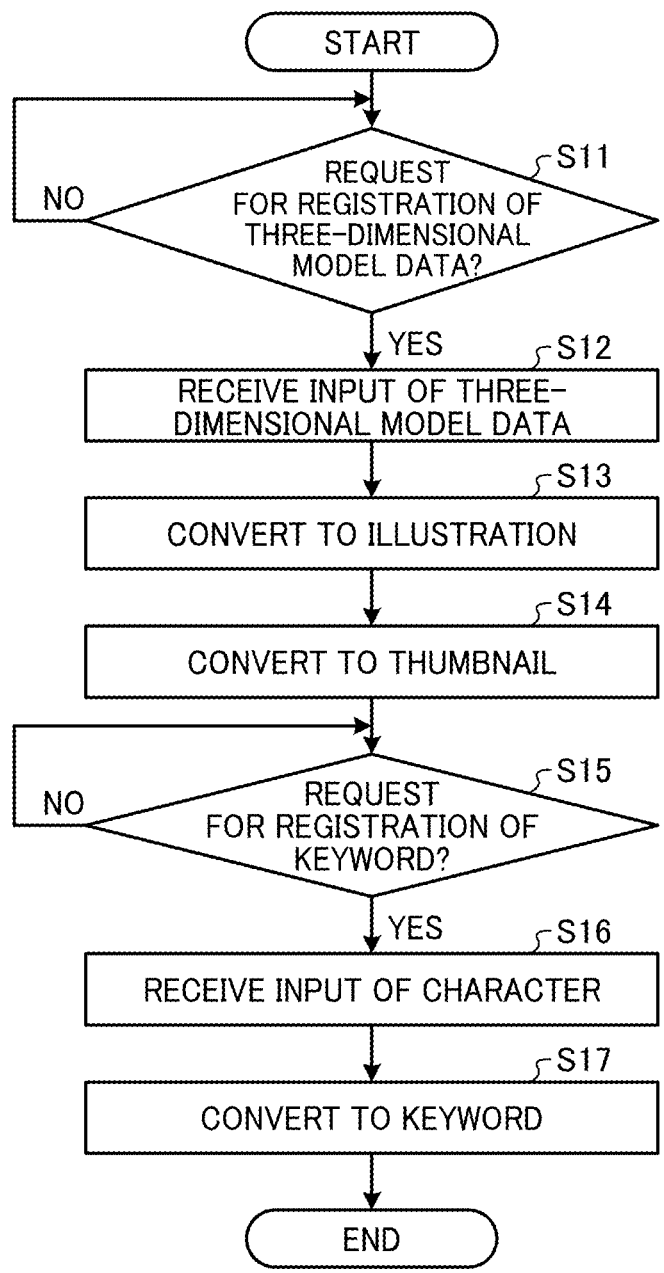
FIG. 14 is a flowchart illustrating steps in a registration process, according to an embodiment of the present disclosure.

A detailed description is now given of the registration process (S1), with reference to FIG. 14. FIG. 14 is a flowchart illustrating steps in the registration process.

In response to activation of the program 500a, the visual communication system 4 waits until a request to register three-dimensional model data is input (No in S11). In response to the request to register three-dimensional model data (Yes in S11), three-dimensional model data is input to the visual communication system 4 (S12). The three-dimensional model data is, for example, polygon data (see Illustration (a) of FIG. 6). The visual communication system 4 converts the three-dimensional model data into an illustration (S13). In other words, the visual communication system 4 converts the three-dimensional model data into three-dimensional illustration data. The three-dimensional illustration data is, for example, three-dimensional line drawing data (see Illustration (b) of FIG. 6). The visual communication system 4 additionally stores the three-dimensional illustration data in the illustration information storage unit 212. Thus, the illustration information 212a (see FIG. 7) is registered in the illustration information storage unit 212.

The visual communication system 4 converts the three-dimensional illustration data into a thumbnail (S14). In other words, the visual communication system 4 converts the three-dimensional illustration data into two-dimensional thumbnail data. The two-dimensional thumbnail data is, for example, two-dimensional line drawing data (see Illustration (c) of FIG. 6). The visual communication system 4 additionally stores the two-dimensional thumbnail data in the thumbnail information storage unit 210 in association with the identification information of the three-dimensional illustration data. Thus, the two-dimensional thumbnail data and the identification information of the three-dimensional illustration data in the thumbnail information 210a (see FIG. 8) is registered in the thumbnail information storage unit 210.

Thereafter, the visual communication system 4 waits until a keyword registration request is input (No in S15). In response to receiving the keyword registration request (Yes in S15), character information is input as being associated with the identification information of the three-dimensional illustration data to the visual communication system 4 (S16). The visual communication system 4 converts the character information into a keyword (S17). In other words, the visual communication system 4 accesses the thumbnail information storage unit 210, to additionally writes the character information in a field corresponding to the identification information of the three-dimensional illustration data in the keyword column 210a1. Thus, the character information (keyword) in the thumbnail information 210a (see FIG. 8) is registered in the thumbnail information storage unit 210. Although the description given above with reference to FIG. 13 is an example in which both the registration process and the communication support process are performed, in another example, just the communication support process is performed based on the information registered in the thumbnail information storage unit 210 and the illustration information storage unit 212 at the time when the process is to be performed. Although the description given above is of an example in which the operation of the flowchart of FIG. 14 is performed by the visual communication system 4 having the configuration of FIG. 5, in another example, the operation is performed by the visual communication system having the configuration of FIG. 9 in any suitable manner. In other words, when the operation is performed by the visual communication system 4 having the configuration of FIG. 9, steps S13 and S14 are not performed, and instead of step S16, a process of associating character information with three-dimensional model data is performed. As a result, the three-dimensional model information 217a as illustrated in FIG. 10 is stored in the three-dimensional model storage unit 217.

Figure 15:
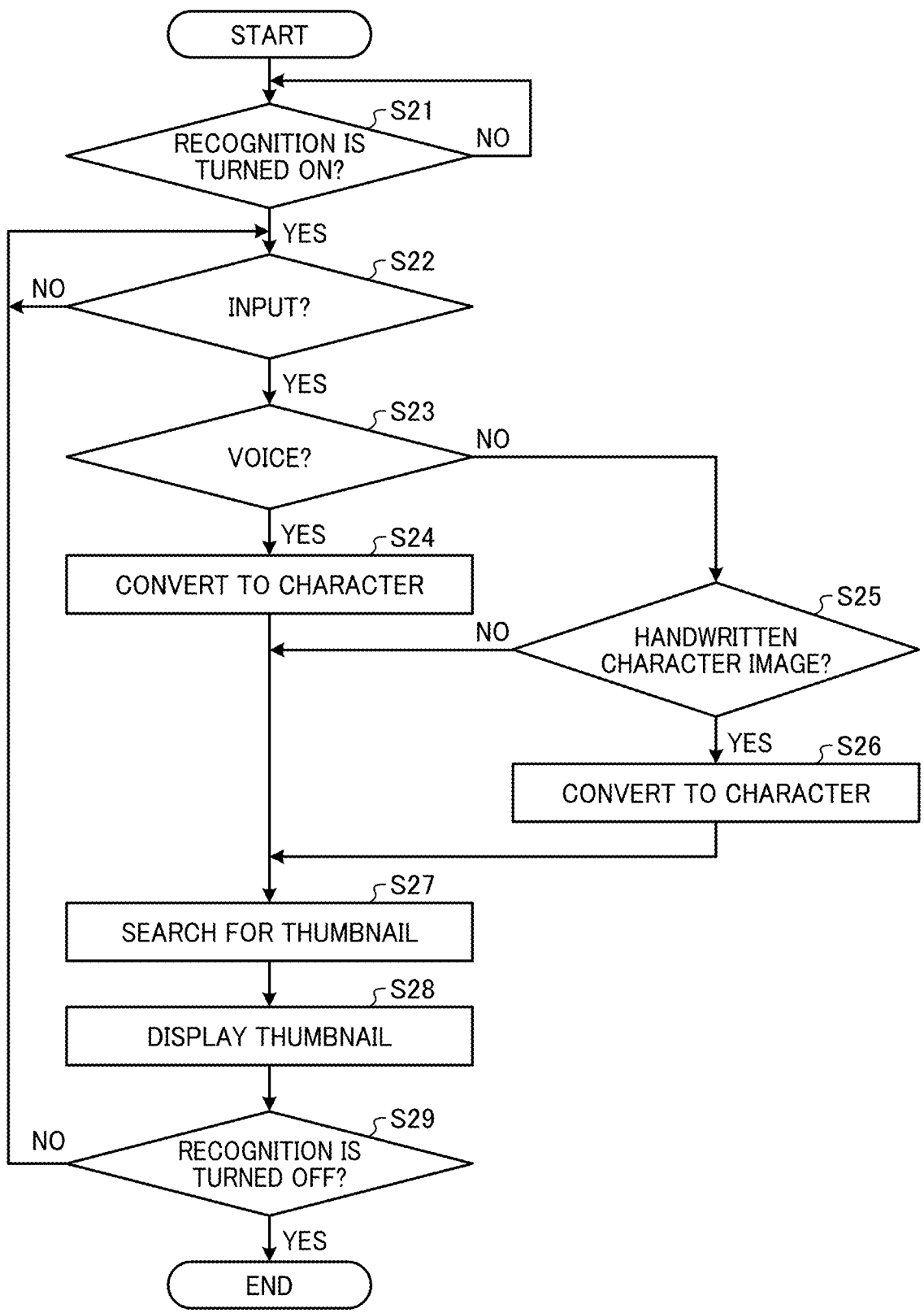
FIG. 15 is a flowchart illustrating steps in a communication support process, according to an embodiment of the present disclosure.
Figure 16:
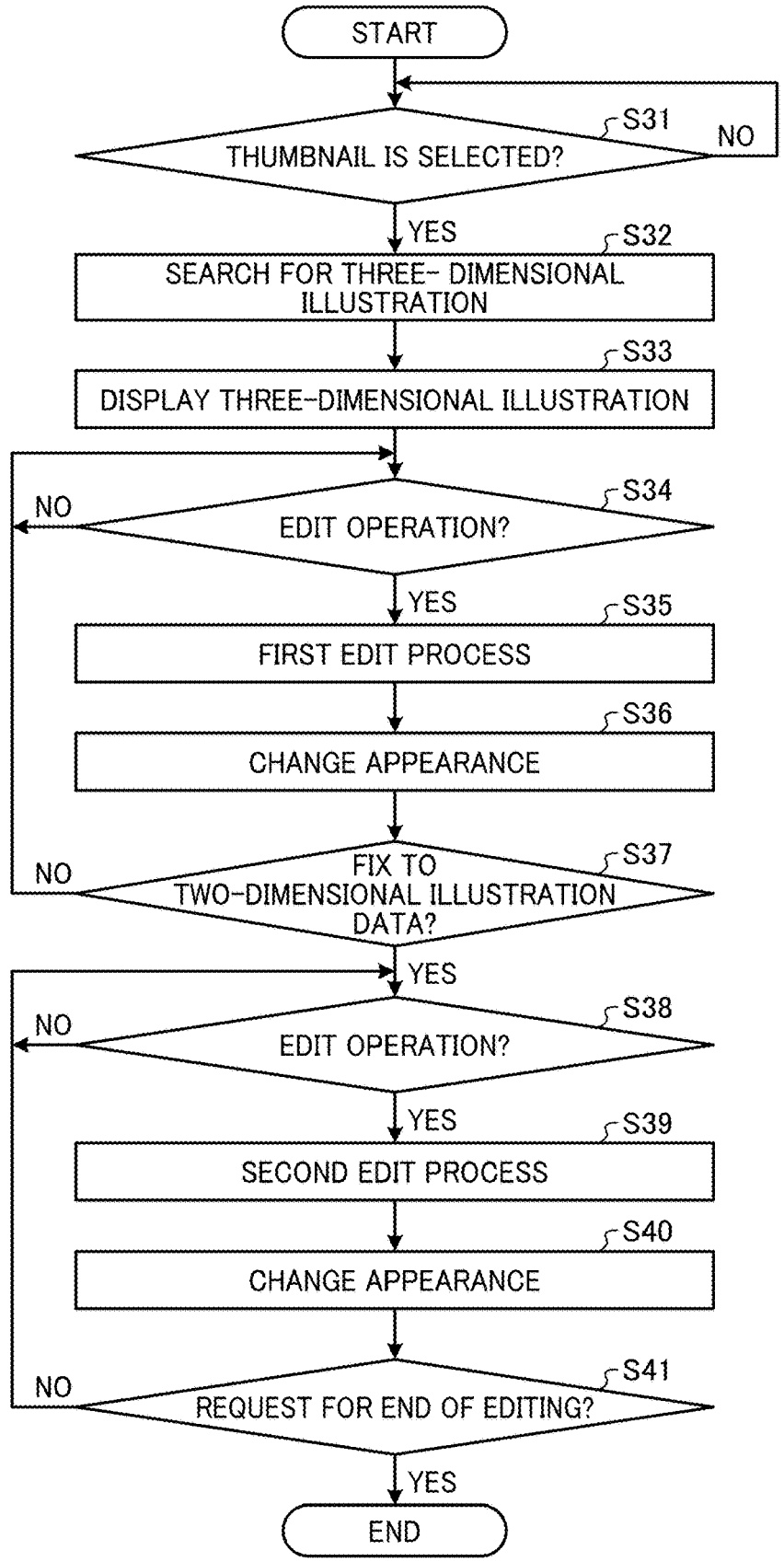
FIG. 16 is a flowchart illustrating steps in a communication support process, according to an embodiment of the present disclosure.

A detailed description is now given of the communication support process (S3), with reference to FIG. 15 and FIG. 16. FIG. 15 and FIG. 16 are flowcharts illustrating steps in the communication support process. The process of FIG. 15 and the process of FIG. 16 can be performed in parallel with each other.

In the process of FIG. 15, when the program 500a is activated and an initial screen is displayed on the display 506, the visual communication system 4 waits until a request to turn on a language information input function is input via the initial screen (No in S21). In response to the request to turn on the language information input function (Yes in S21), the visual communication system 4 waits until language information is input (No in S22). In response to an input of language information (Yes in S22), the visual communication system 4 determines whether the input language information is voice information (S23). When the language information is voice information (Yes in S23), the visual communication system 4 performs speech recognition processing on the voice information to convert the voice information into character information (S24). The visual communication system 4 sets the character information obtained by the conversion as a recognition result. When the language information is not voice information (No in S23), the visual communication system 4 determines whether the language information is a handwritten character image (S25). When the language information is a handwritten character image (Yes in S25), the visual communication system 4 performs text recognition processing on the handwritten character image to convert the handwritten character image into character information (S26). The visual communication system 4 sets the character information obtained by the conversion as a recognition result. When the language information is not a handwritten character image, in other words, when the language information is character information input by typing to the keyboard 541 (No in S25), the visual communication system 4 sets the input character information as a recognition result. Then, the process proceeds to S27. In one example, the steps S23 to S26 are performed by the recognition unit 103 of the visual communication system 4.

The visual communication system 4 accesses the thumbnail information storage unit 210, to search for two-dimensional thumbnail data using a keyword included the character information as the recognition result of the language information as a search keyword (S27). The visual communication system 4 controls the display to display the retrieved one or more pieces of two-dimensional thumbnail data at a particular location on the display 506 (S28).

The visual communication system 4 repeats the processes of S22 to S28 at high speed until a request to turn off the language information input function is input (No in S29). In other words, each time the language information from the user is received, the visual communication system 4 switches one or more thumbnail images displayed on the display screen, whereby one or more thumbnail images are speedily updated for display. This allows the user to select one or more desired thumbnail images close to a scene in the user's mind at the time of speaking or inputting characters without stopping communication by a conversation, etc.

In response to the request to turn off the language information input function (Yes in S29), the visual communication system 4 ends the operation of FIG. 15. Although the description given above is of an example in which the operation of the flowchart of FIG. 15 is performed by the visual communication system 4 having the configuration of FIG. 5, in another example, the operation is performed by the visual communication system having the configuration of FIG. 9 in any suitable manner. In other words, when the operation is performed by the visual communication system 4 having the configuration of FIG. 9, the visual communication system searches for three-dimensional model data in step S27, and instead of step S28, performs a process of displaying three-dimensional illustration data, which is obtained by converting three-dimensional model data to an illustration.

In an operation of FIG. 16, the visual communication system 4 waits until any two-dimensional thumbnail is selected from the one or more pieces of two-dimensional thumbnail data displayed in S28 (No in S31). In response to selection of particular two-dimensional thumbnail data from one or more pieces of two-dimensional thumbnail data displayed in S28 (Yes in S31), the visual communication system 4 accesses the illustration information storage unit 212, to search for three-dimensional illustration data associated with the selected two-dimensional thumbnail data (S32). The visual communication system 4 controls the display to display the retrieved three-dimensional illustration data on the display 506 (S33).

The visual communication system 4 waits until an editing operation is performed on the displayed three-dimensional illustration data (No in S34). In response to an editing operation on the displayed three-dimensional illustration data (Yes in S34), the visual communication system 4 performs a first editing processing (S35). The first editing processing is the three-dimensional editing processing. In the first editing processing, the visual communication system 4 receives the three-dimensional rotation operation, the three-dimensional movement operation, the three-dimensional enlargement operation, and the three-dimensional reduction operation, for example. In response to these operation request, the visual communication system 4 changes the appearance of the three-dimensional illustration data displayed on the display 506 (S36). The visual communication system 4 repeats the processes of S34 to S36 until the three-dimensional illustration data is fixed to two-dimensional illustration data (No in S37).

When the three-dimensional illustration data is fixed to two-dimensional illustration data (Yes in S37), the visual communication system 4 waits until an operation for editing the fixed two-dimensional illustration data is input (No in S38). In response an input of an operation for editing the fixed two-dimensional illustration data (Yes in S38), the visual communication system 4 performs a second editing processing (S39). The second editing processing is the two-dimensional editing processing. In the second editing processing, the visual communication system 4 receives the two-dimensional rotation operation, the two-dimensional movement operation, the two-dimensional enlargement operation, the two-dimensional reduction operation, the operation of erasing a part, the operation of adding a handwritten line drawing, and the operation of coloring, for example. In response to these operation request, the visual communication system 4 changes the appearance of the two-dimensional illustration data displayed on the display 506 (S40). The visual communication system 4 repeats the processes of S38 to S40 until a request to end the editing is input (No in S41). In other words, a first stage editing processing including the loop from S34 to S37 and the second stage editing processing including the loop from S38 to S41 enable to accurately and quickly express an illustration close to one's mind at the time of speaking or inputting a character.

The visual communication system 4 ends the operation of FIG. 16 in response to a request to end the editing (Yes in S41). Although the description given above is of an example in which the operation of the flowchart of FIG. 16 is performed by the visual communication system 4 having the configuration of FIG. 5, in another example, the operation is performed by the visual communication system having the configuration of FIG. 9 in any suitable manner. In other words, when the operation is performed by the visual communication system 4 having the configuration of FIG. 9, one or more pieces of three-dimensional illustration data are displayed at the time when the operation of FIG. 15 is completed. Accordingly, in step S31 the visual communication system waits until any three-dimensional illustration data instead of two-dimensional thumbnail data is selected. In response to selection of a desired three-dimensional illustration data, the process of step S32 is not performed, and the selected three-dimensional illustration data in step S33. The visual communication system 4 performs the processes of step S34 and subsequent steps.

Figure 17:
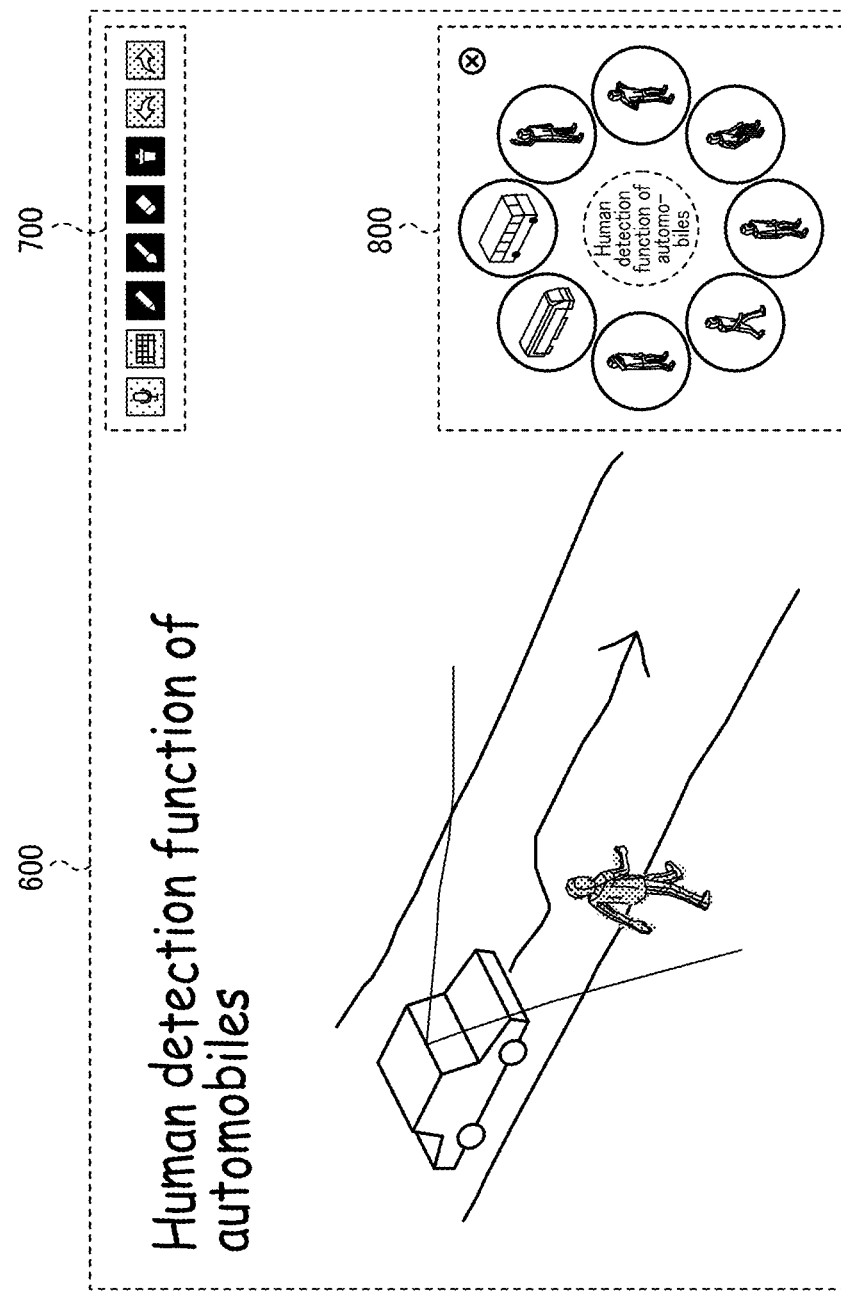
FIG. 17 is a diagram illustrating an example of a configuration of a display screen displayed by the visual communication system, according to an embodiment of the present disclosure.

A description is now given of a screen (display screen by the visual communication system 4) displayed on the display 506 of the client terminal 1 by the visual communication system 4, with reference to FIG. 17. FIG. 17 is a diagram illustrating an example of a configuration of a display screen displayed by the visual communication system 4.

As illustrated in FIG. 17, the display screen by the visual communication system 4 includes a drawing result display area 600, an operation palette 700, and a thumbnail display area 800.

The drawing result display area 600 is an area in which a result of drawing information generation by the drawing information generation unit 400 (see FIG. 2) is output. The operation palette 700 includes icons used to invoke input units such as the voice input unit 101, the character input unit 102 (see FIG. 4), and the two-dimensional data editing input unit 304 (see FIG. 12). In the thumbnail display area 800, language information recognized by the recognition unit 103 (see FIG. 4) and two-dimensional thumbnail data output by the thumbnail display unit 203 (see FIG. 5) are displayed.

A layout of the areas and design shapes of the areas illustrated in FIG. 17 are merely examples, and do not limit the scope of rights. For example, in FIG. 17, eight thumbnails each surrounded by a circular frame are displayed on the thumbnail display area 800. In another example, the frame is omitted, the frame has any other suitable shape, and/or any other suitable number of thumbnails are displayed. In still another example, the recognized language information is not displayed.

A description is now given of an overview of a transition of a screen (display screen by the visual communication system 4) displayed on the display 506 of the client terminal 1 by the visual communication system 4, with reference to FIG. 18. FIG. 18 is a schematic diagram illustrating an example of a transition of a display screen displayed by the visual communication system 4. FIG. 18 illustrates an operation in which two-dimensional thumbnail data is called based on language information.

In response to detection of pressing a language information recognition button 701 illustrated in Screen (a) of FIG. 18, the visual communication system 4 shifts to a language information recognition mode. In response to acquiring language information (first language information) input by speech, handwriting, typing, or the like in the language information recognition mode, the visual communication system 4 displays a recognition result of the language information and one or more two-dimensional thumbnail data associated with the recognition result in the thumbnail display area 800. In response to detection of an operation of pressing a two-dimensional data edit button 702, the visual communication system 4 transitions to a drawing result editing mode in which the drawing result display area 600 illustrated in FIG. 17 is editable.

For example, Screen (a) of FIG. 18 illustrates a state in which the visual communication system 4 recognizes handwritten characters drawn in the drawing result display area 600 and displays character information as a result of the recognition and one or more two-dimensional thumbnail data associated with the character information in the thumbnail display area 800.

In response to further acquiring language information (second language information) input by speech, handwriting, typing, or the like, the visual communication system 4 changes at least a part of the one or more two-dimensional thumbnail data displayed in the thumbnail display area 800. Thereby, the visual communication system 4 updates the display of the recognition result of the language information and the one or more two-dimensional thumbnail data associated with the recognition result.

For example, in response to recognizing a speech as illustrated in Screen (b) of FIG. 18 in a state in which Screen (a) of FIG. 18 is being displayed, the visual communication system 4 changes a state of the thumbnail display area 800 in real time according to character information as the recognition result. Screen (b) of FIG. 18 illustrates a state in which the visual communication system 4 updates the appearance of the thumbnail display area 800 based on the character information as the new recognition result and one or more two-dimensional thumbnail data associated with the character information.

Specifically, according to a thumbnail image corresponding to the newly input language information (the second language information), the visual communication system 4 changes at least a part of a display of thumbnail images already displayed and displays the changed the at least a part on the display 506 (display means).

Examples of changing at least a part of the display appearance of thumbnail images already displayed include, but are not limited to, changing a position and/or size of the thumbnail images already displayed in order to display one or more thumbnail image corresponding to the newly input language information in addition to the thumbnail images already displayed, deleting any one or more of the thumbnail images already displayed in order to replace any one or more of the already displayed thumbnail image with one or more thumbnail images corresponding to the newly input language information, and changing an image around the thumbnail images already displayed.

In another example, the visual communication system 4 changes the display of the thumbnail display area 800 each time the visual communication system recognizes a new handwritten character or typed character in addition to speech.

In still another example, when two-dimensional thumbnail data to be displayed exceeds a range of the thumbnail display area 800, the visual communication system 4 display two-dimensional thumbnail data in the thumbnail display area 800 in a manner that the newly retrieved two-dimensional thumbnail data is replaced with the already displayed thumbnail data in order from the oldest one.

Although the description given above with reference to FIG. 18 is an example in which the language information recognition button 701 is used as a switch for switching to the language information recognition mode, in another example, any other suitable way is applicable such as utterance of a particular word or command input.

As illustrated in FIG. 18, each time language information from the user is received, the visual communication system 4 switches one or more thumbnail images displayed on the display screen, whereby one or more thumbnail images are speedily updated for display. This allows the user to select one or more desired thumbnail images close to a scene in the user's mind at the time of speaking or inputting characters without stopping communication by a conversation, etc.

Figure 19:
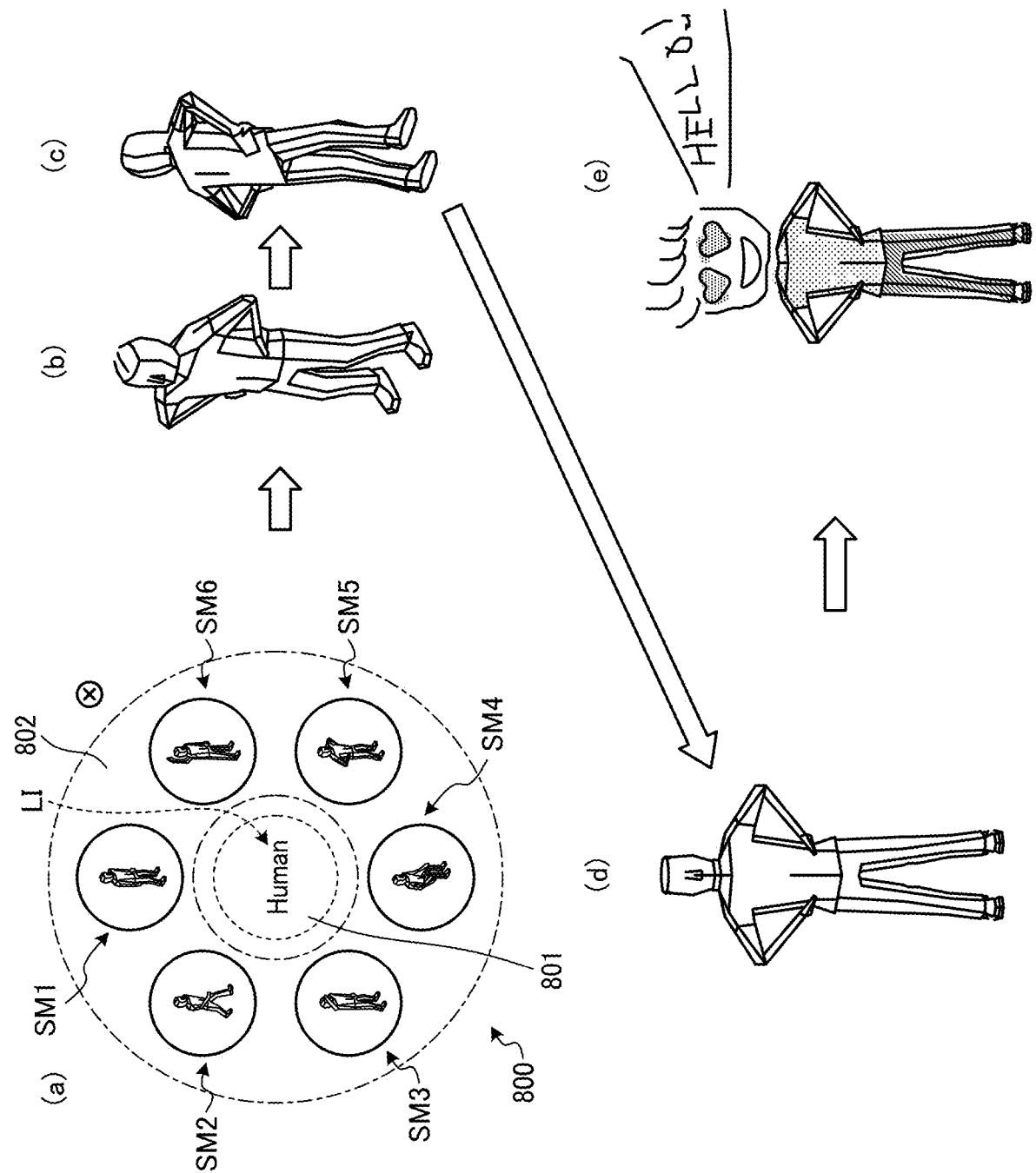
FIG. 19 is a diagram illustrating an example of a flow of a two-stage editing processing, according to an embodiment of the present disclosure.

A description is now given of a flow of a two-stage editing processing on an illustration performed by the visual communication system 4, with reference to FIG. 19. FIG. 19 is a diagram illustrating an example of a flow of a two-stage editing processing.

In Illustration (a) of FIG. 19, the visual communication system 4 displays character information LI of "human" and two-dimensional thumbnail data SM1 to SM6 associated with the character information LI in the thumbnail display area 800 in accordance with language information "human".

The character information LI is displayed in a text data area 801. In Illustration (a) of FIG. 19, as an example, a circular dotted line is displayed in a manner that a user can recognize the circular dotted line, and the character information LI is displayed in an area defined by the circular dotted line.

The two-dimensional thumbnail data SM1 to SM6 are displayed in a thumbnail data area 802 side by side circularly in a manner that the two-dimensional thumbnail data SM1 to SM6 overlap each other. In another example, the two-dimensional thumbnail data are displayed in a manner that they overlap each other. In still another example, the two-dimensional thumbnail data are displayed randomly. In this example, the two-dimensional thumbnail data are displayed in an area defined by two alternate long and short dashed lines. In another example, a line visible to the user may be actually displayed at the position of the alternate long and short dashed line so that the user can easily recognize the thumbnail data area 802.

In response to receiving a selection operation of the two-dimensional thumbnail data SM5, the visual communication system 4 calls three-dimensional illustration data associated with the two-dimensional thumbnail data SM5 and displays the called three-dimensional illustration data in the drawing result display area 600 as illustrated in Illustration (b) of FIG. 19.

In the three-dimensional editing processing, the visual communication system 4 receives the three-dimensional rotation operation, the three-dimensional movement operation, the three-dimensional enlargement operation, and the three-dimensional reduction operation, for example. In response to these operation request, the visual communication system 4 three-dimensionally changes the appearance of the three-dimensional illustration data as illustrated in Illustration (c) of FIG. 19.

In response to a predetermined operation as a trigger, the visual communication system 4 fixes the three-dimensional illustration data to two-dimensional illustration data as illustrated in Illustration (d) of FIG. 19. Examples of the predetermined operation as a trigger include, but are not limited to, pressing a button for two-dimensional editing operation (e.g., pressing the two-dimensional data edit button 702 illustrated in Screen (a) of FIG. 18.

In the two-dimensional editing processing, the visual communication system 4 receives the two-dimensional rotation operation, the two-dimensional movement operation, the two-dimensional enlargement operation, the two-dimensional reduction operation, the operation of erasing a part, the operation of adding a handwritten line drawing, and the operation of coloring, for example. In response to these operation request, the visual communication system 4 two-dimensionally changes the appearance of the two-dimensional illustration data as illustrated in Illustration (e) of FIG. 19.

As illustrated in FIG. 19, the first stage editing processing (Illustration (b) of FIG. 19 and Illustration (c) of FIG. 19) and the second stage editing processing (Illustration (e) of FIG. 19) enable to accurately and quickly express an illustration close to one's mind at the time of speaking or inputting a character.

Figure 20A:
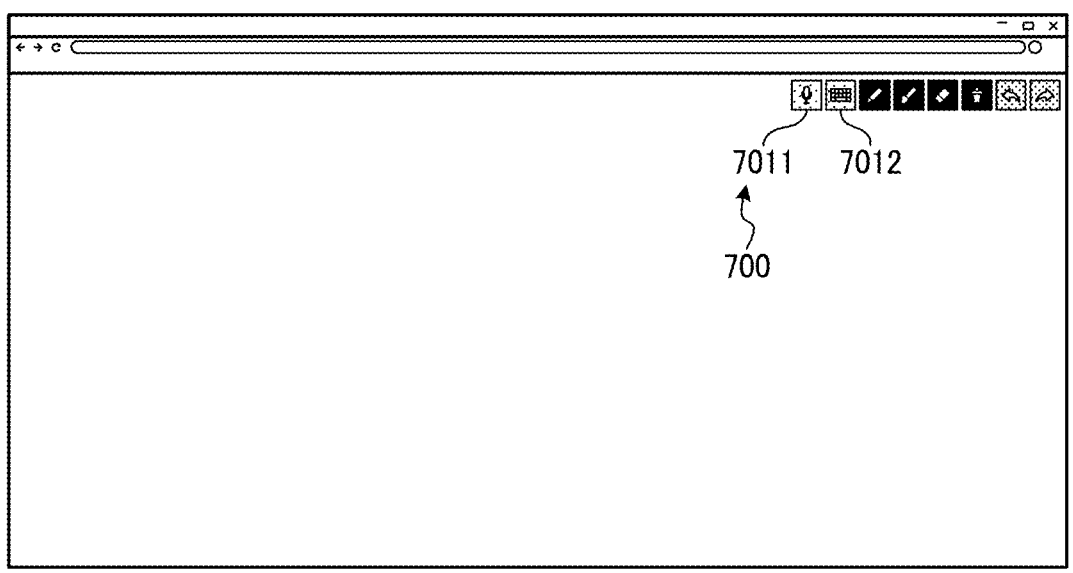
FIGS. 20A and 20B are diagrams illustrating an example of details of a transition of a display screen displayed by the visual communication system, according to an embodiment of the present disclosure.
Figure 20B:
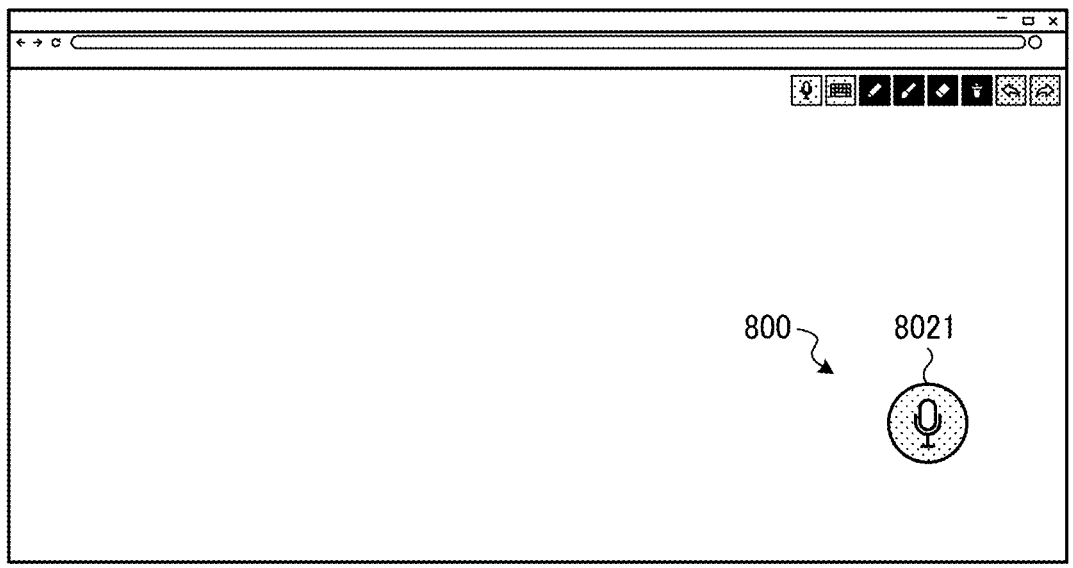

A detailed description is now given of the transition of a screen (display screen by the visual communication system 4) displayed on the display 506 of the client terminal 1 by the visual communication system 4, with reference to FIG. 20A and FIG. 20B to FIG. 27. FIG. 20A and FIG. 20B to FIG. 27 are diagrams illustrating an example of details of a transition of a display screen displayed by the visual communication system 4. FIG. 20A and FIG. 20B illustrate an operation in which two-dimensional thumbnail data is called based on language information, a thumbnail is selected, and an illustration is edited.

In response to detection of pressing a voice input button 7011 in the operation palette 700 illustrated in FIG. 20A, the visual communication system 4 turns on the language information recognition function and displays an icon 8021 indicating that voice input is in a standby state in the thumbnail display area 800 as illustrated in FIG. 20B. When a key input button 7012 in the operation palette 700 is pressed, typing input using the keyboard is enabled, and an icon indicating that typing input is in a standby state is displayed. The icon 8021 and the icon indicating that the typing input is in the standby state are examples of a language information recognition state display icon.

Figure 21:
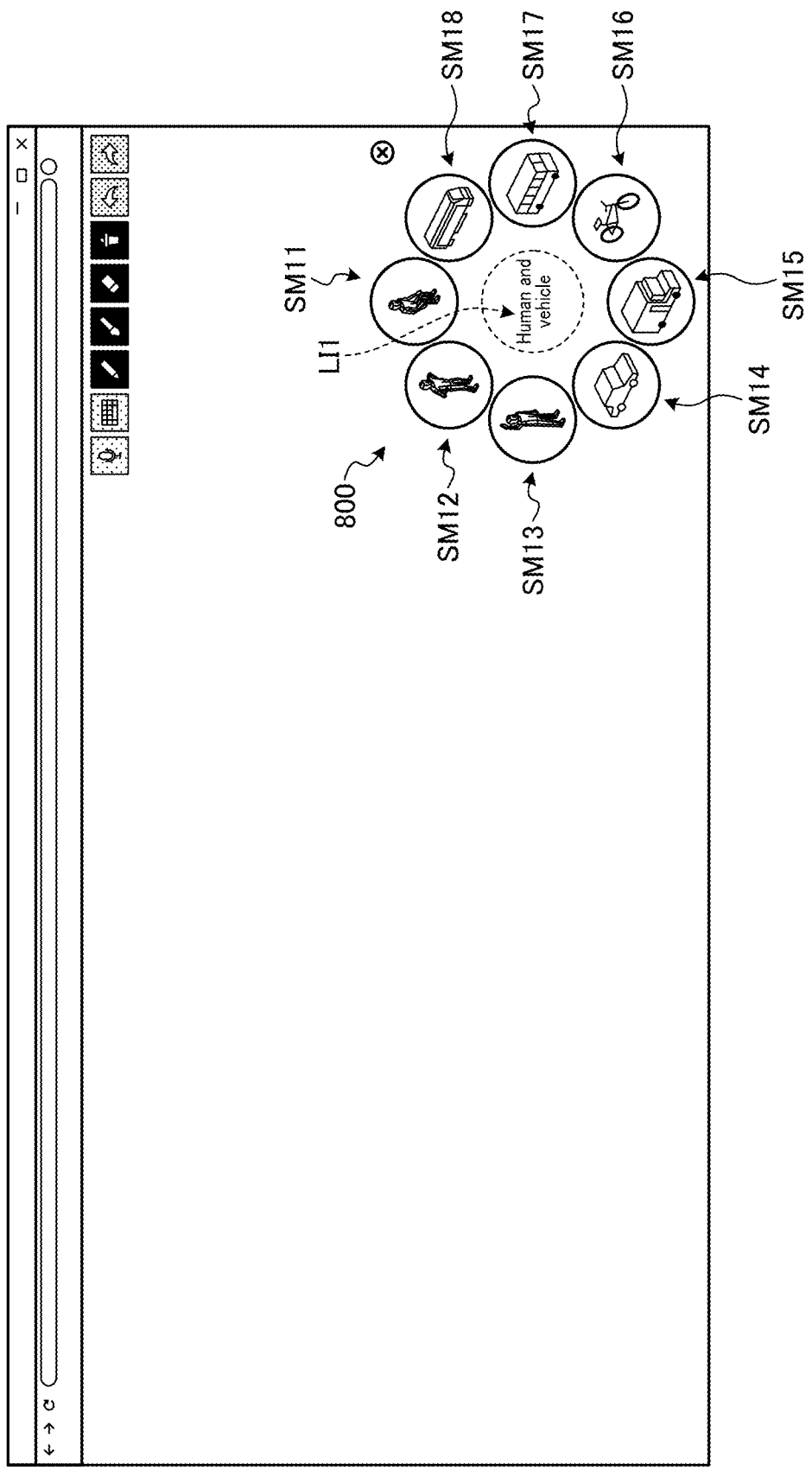
FIG. 21 is a diagram illustrating an example of details of a transition of a display screen displayed by the visual communication system, according to an embodiment of the present disclosure.

In response to detecting an utterance of "human and vehicle", the visual communication system 4 displays character information LI1 "human and vehicle" and two-dimensional thumbnail data SM11 to SM18 associated with the character information LI1 in the thumbnail display area 800 as illustrated in FIG. 21. In one example, the thumbnail data associated with the character information are thumbnail data associated with the entire character information "human and vehicle". In another example, the character information is divided into keywords such as "human" and "vehicle". In this case, the thumbnail data associated with the character information is a group including thumbnail data associated with "human" and thumbnail data associated with "vehicle".

Figure 22:
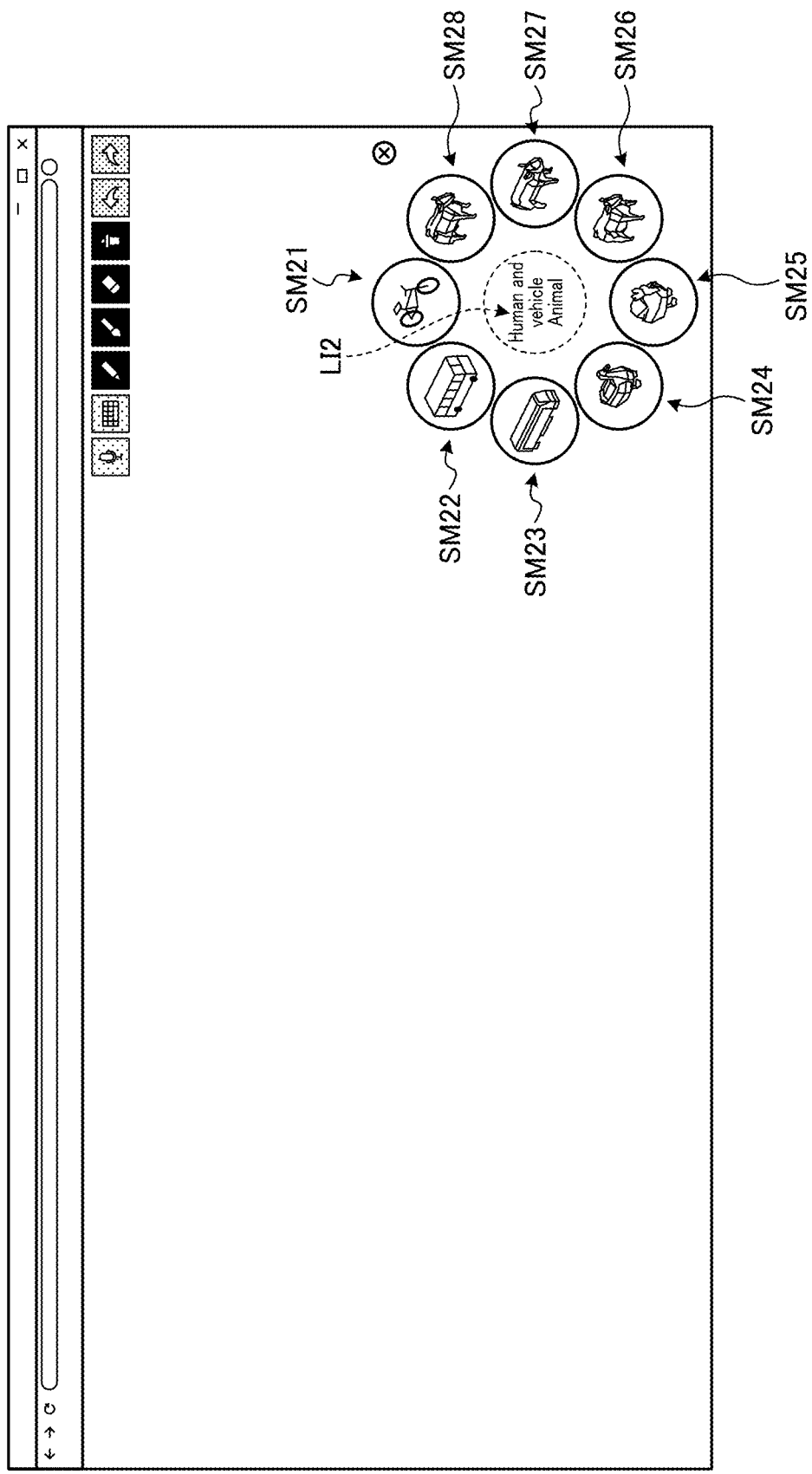
FIG. 22 is a diagram illustrating an example of details of a transition of a display screen displayed by the visual communication system, according to an embodiment of the present disclosure.

In response to further detecting an utterance of "animal", the visual communication system 4 updates the displayed content to character information LI2 "human and vehicle animal" and two-dimensional thumbnail data SM21 to SM28 associated with the character information LI2 in the thumbnail display area 800 as illustrated in FIG. 22. In other words, the visual communication system 4 updates and displays two-dimensional thumbnail data in real time each time an input of language information is detected. In one example, the thumbnail data associated with the character information are thumbnail data associated with the entire character information "human and vehicle". In another example, the character information is divided into keywords such as "human", "vehicle", and "animal". In this case, the thumbnail data associated with the character information is a group including thumbnail data associated with "human", thumbnail data associated with "vehicle" and thumbnail data associated with "animal".

As illustrated in FIG. 21 and FIG. 22, each time language information from the user is received, the visual communication system 4 switches one or more thumbnail images displayed on the display screen, whereby one or more thumbnail images are speedily updated for display. This allows the user to select one or more desired thumbnail images close to a scene in the user's mind at the time of speaking or inputting characters without stopping communication by a conversation, etc.

Figure 23:
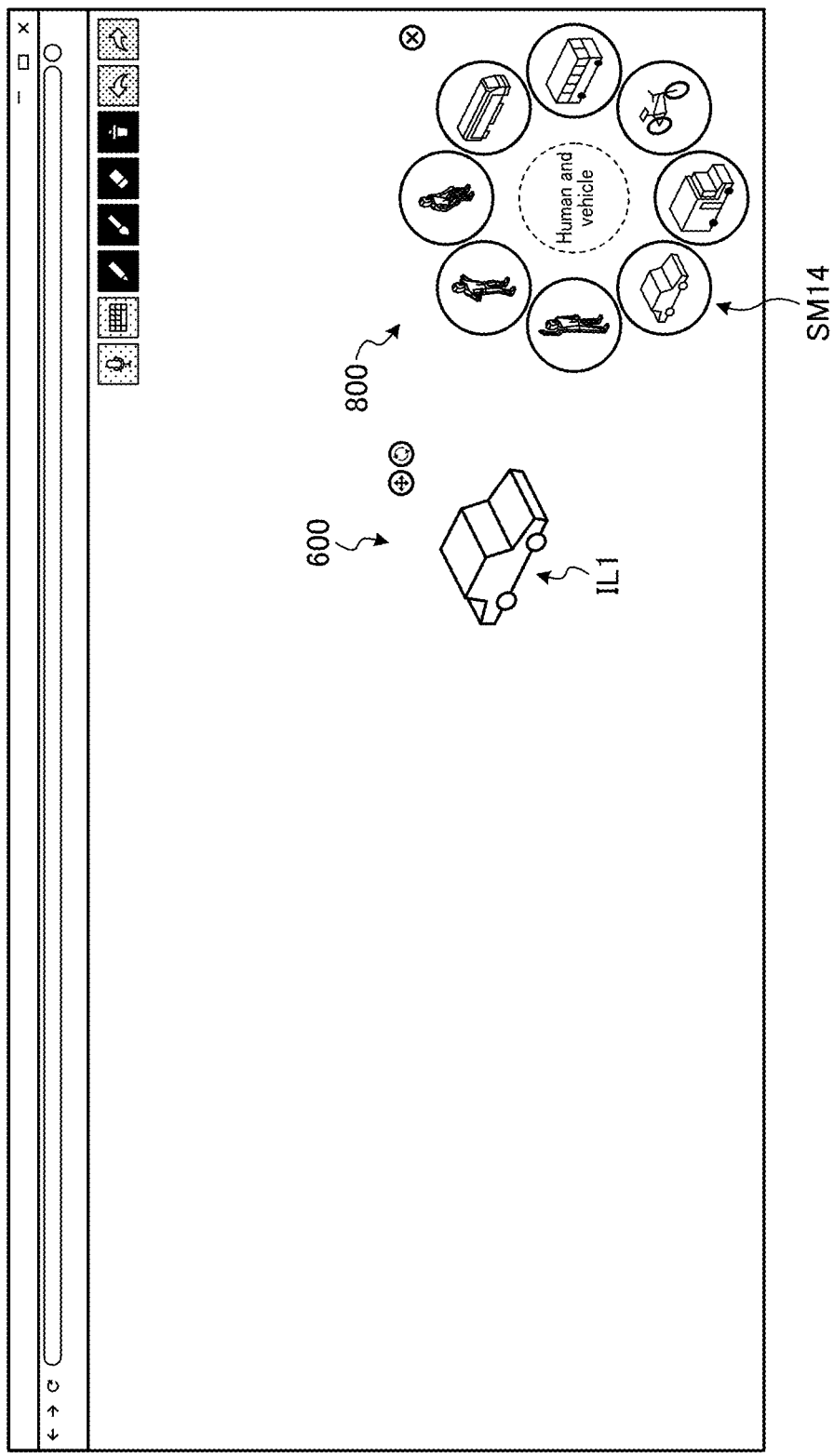
FIG. 23 is a diagram illustrating an example of details of a transition of a display screen displayed by the visual communication system, according to an embodiment of the present disclosure.

In response to detecting a selection of two-dimensional thumbnail data SM14 on the screen of FIG. 21, the visual communication system 4 calls three-dimensional illustration data IL1 associated with the two-dimensional thumbnail data SM14 and displays the called three-dimensional illustration data IL1 in the drawing result display area 600 as illustrated in FIG. 23.

In the three-dimensional editing processing, the visual communication system 4 receives the three-dimensional rotation operation, the three-dimensional movement operation, the three-dimensional enlargement operation, and the three-dimensional reduction operation, for example. In response to these operation request, the visual communication system 4 three-dimensionally changes the appearance of the three-dimensional illustration data IL1 as illustrated in FIG. 24-1.

Figures 1, 24:
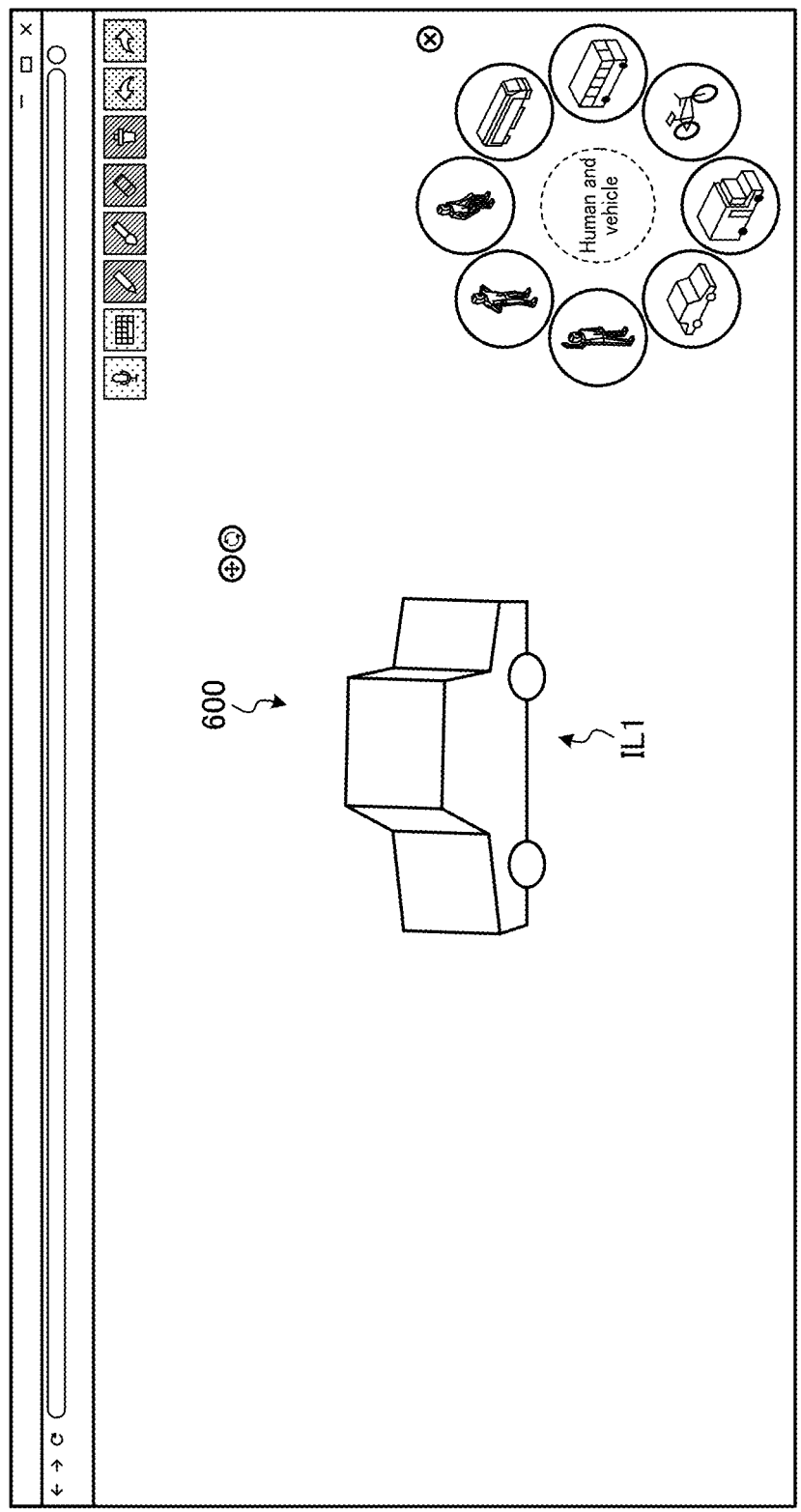
Figures 2, 24:
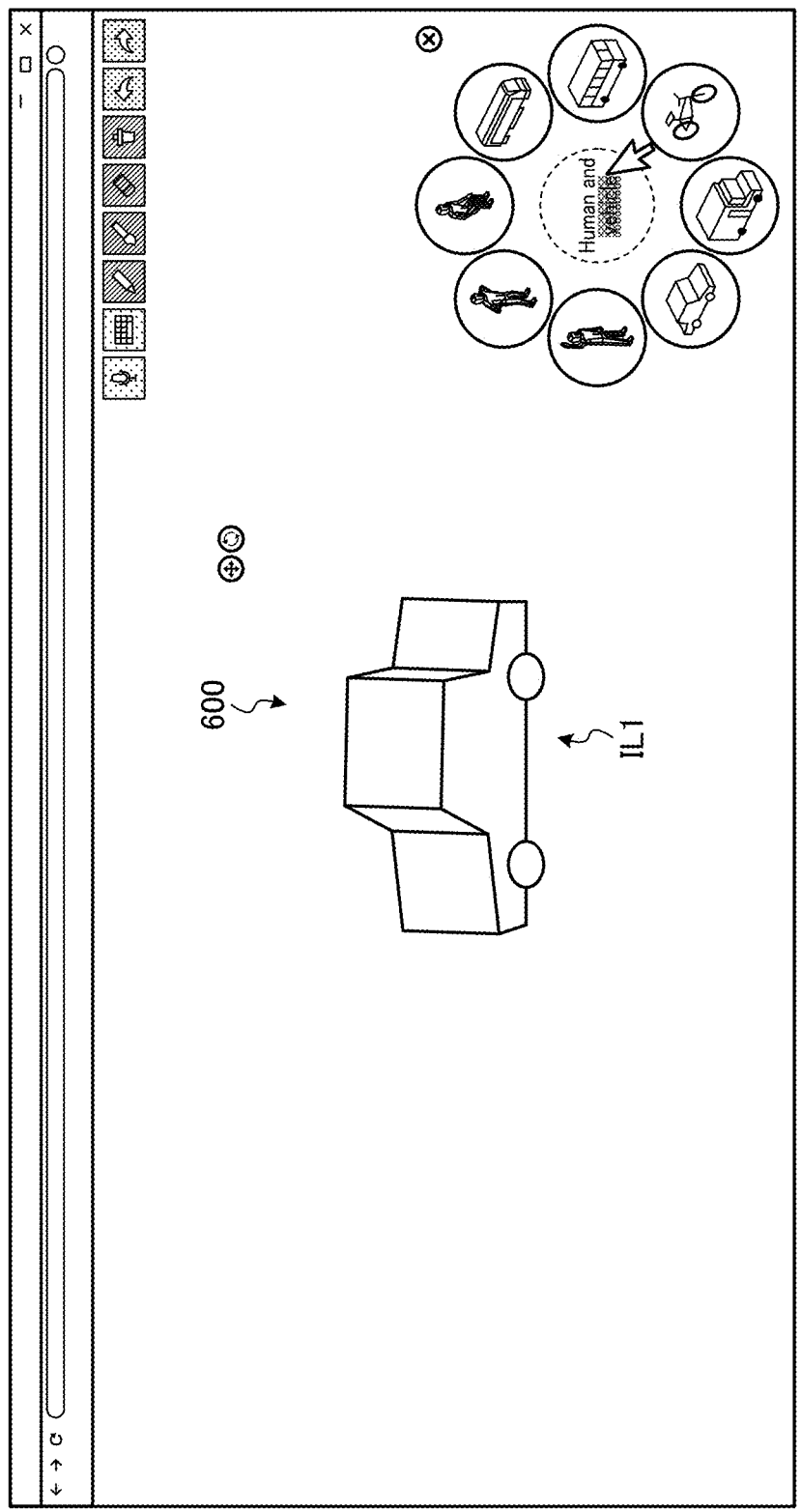
Figures 3, 24:
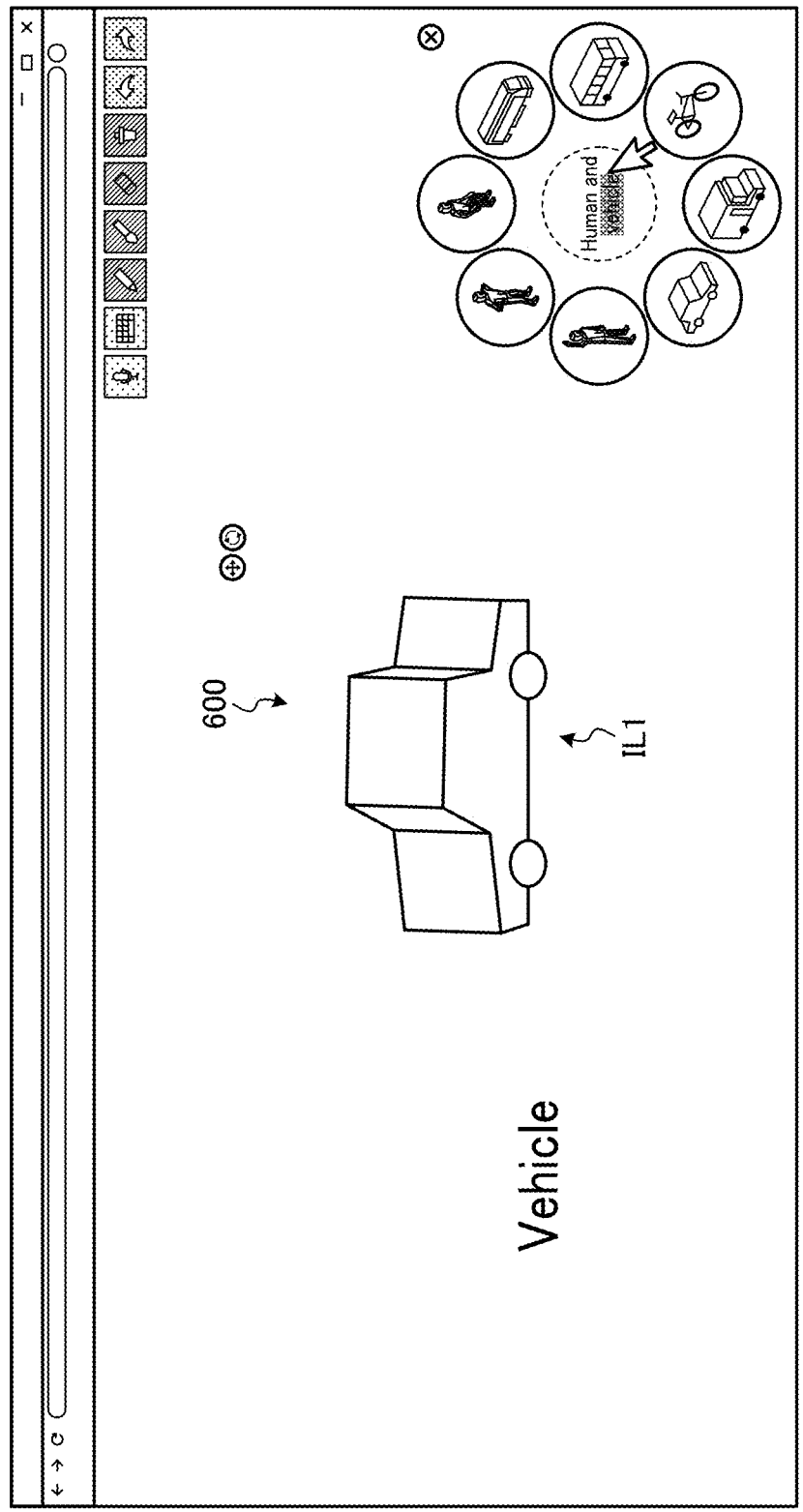

In another example, as illustrated in FIG. 24-2 and FIG. 24-3, the visual communication system 4 receives the user's operation of dragging text displayed in the text data area 801 and displays the dragged text as a text image in the drawing result display area 600.

In FIG. 24-2, for example, the user drags and selects a part of the text displayed in the text data area 801 with a cursor. In response to detecting that text is selected and dragged, the visual communication system 4 converts the selected and dragged text data into image data. Further, as illustrated in FIG. 24-3, the visual communication system 4 displays the text image data obtained by the conversion in the drawing result display area 600. The text image data obtained by conversion can be either a two-dimensional image or a three-dimensional image. The text image data obtained by conversion can be moved, enlarged, reduced, rotated, and/or edited in various manners in the drawing result display area 600 using the two-dimensional data edit button 702.

Figure 25:
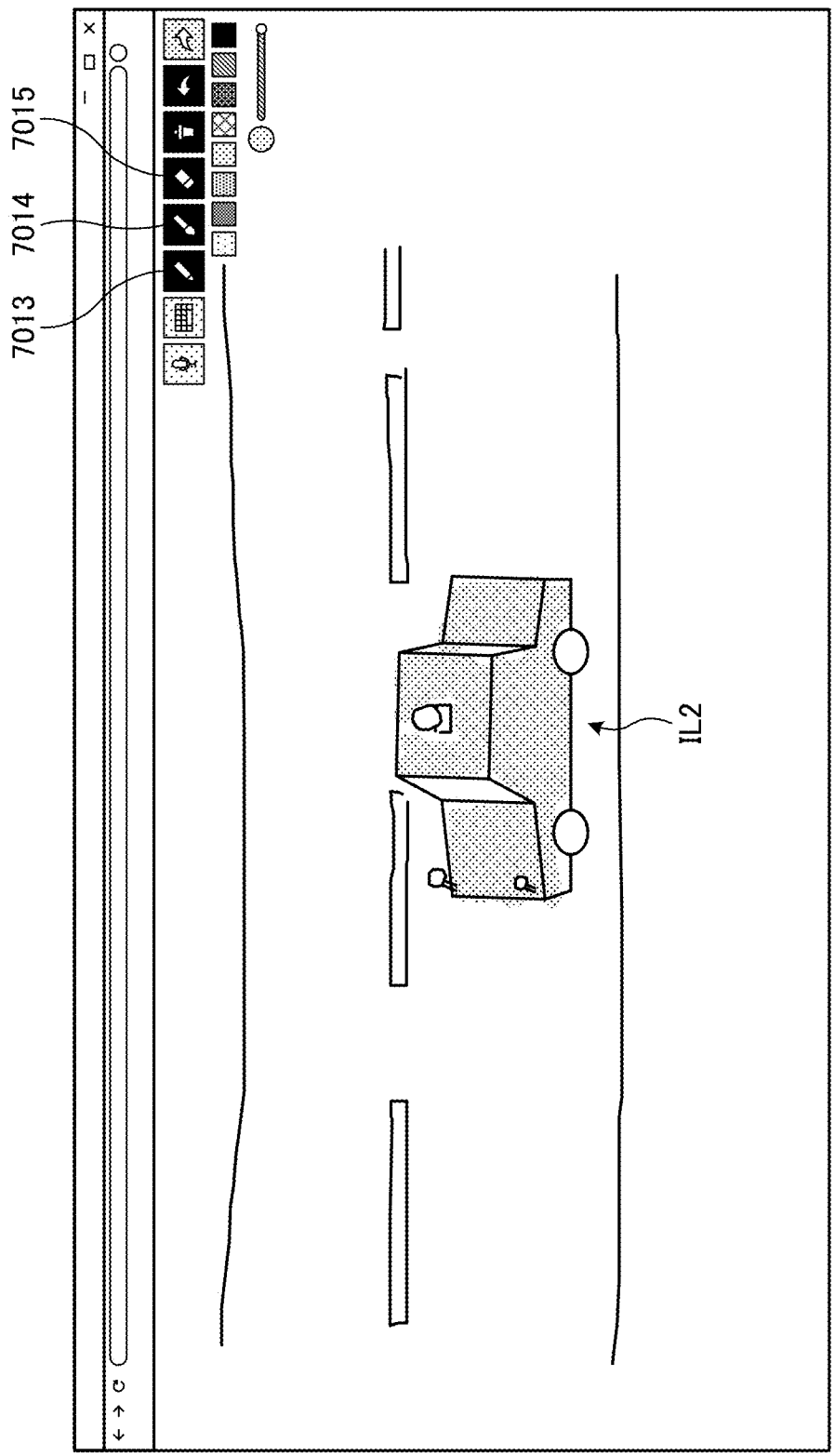
FIG. 25 is a diagram illustrating an example of details of a transition of a display screen displayed by the visual communication system, according to an embodiment of the present disclosure.

In response to detection of pressing any one of buttons for the two-dimensional editing processing such as an addition button 7013, a coloring button 7014, and an eraser button 7015, the visual communication system 4 fixes the three-dimensional illustration data IL1 to two-dimensional illustration data IL2 as illustrated in FIG. 25. In the present embodiment, in one example, the visual communication system 4 identifies the pressing of any one of the buttons for two-dimensional editing processing as a request to turn off a language information recognition function, and transitions to a state in which the two-dimensional editing processing is enabled.

Figure 26:
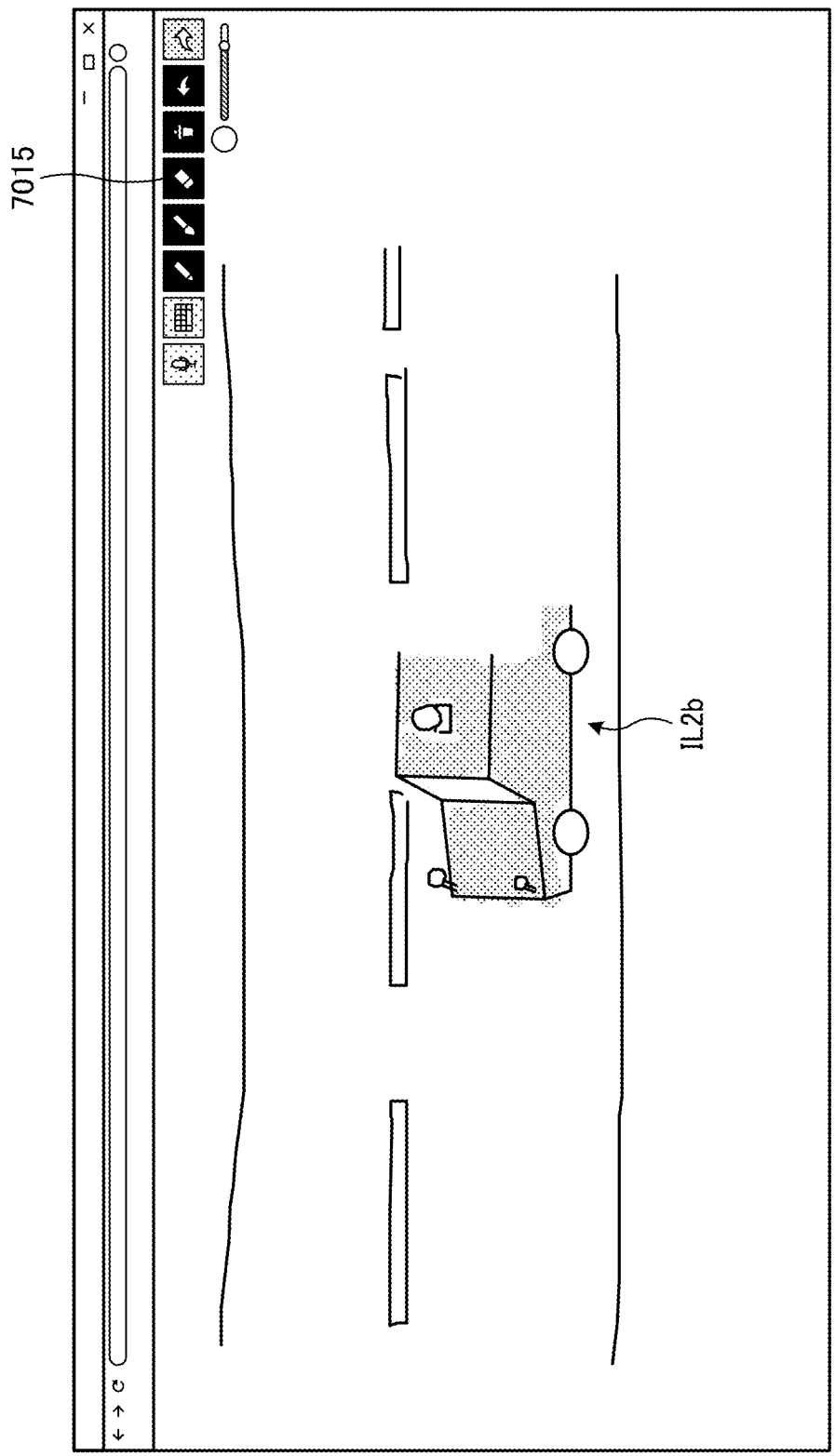
FIG. 26 is a diagram illustrating an example of details of a transition of a display screen displayed by the visual communication system, according to an embodiment of the present disclosure.
Figure 27:
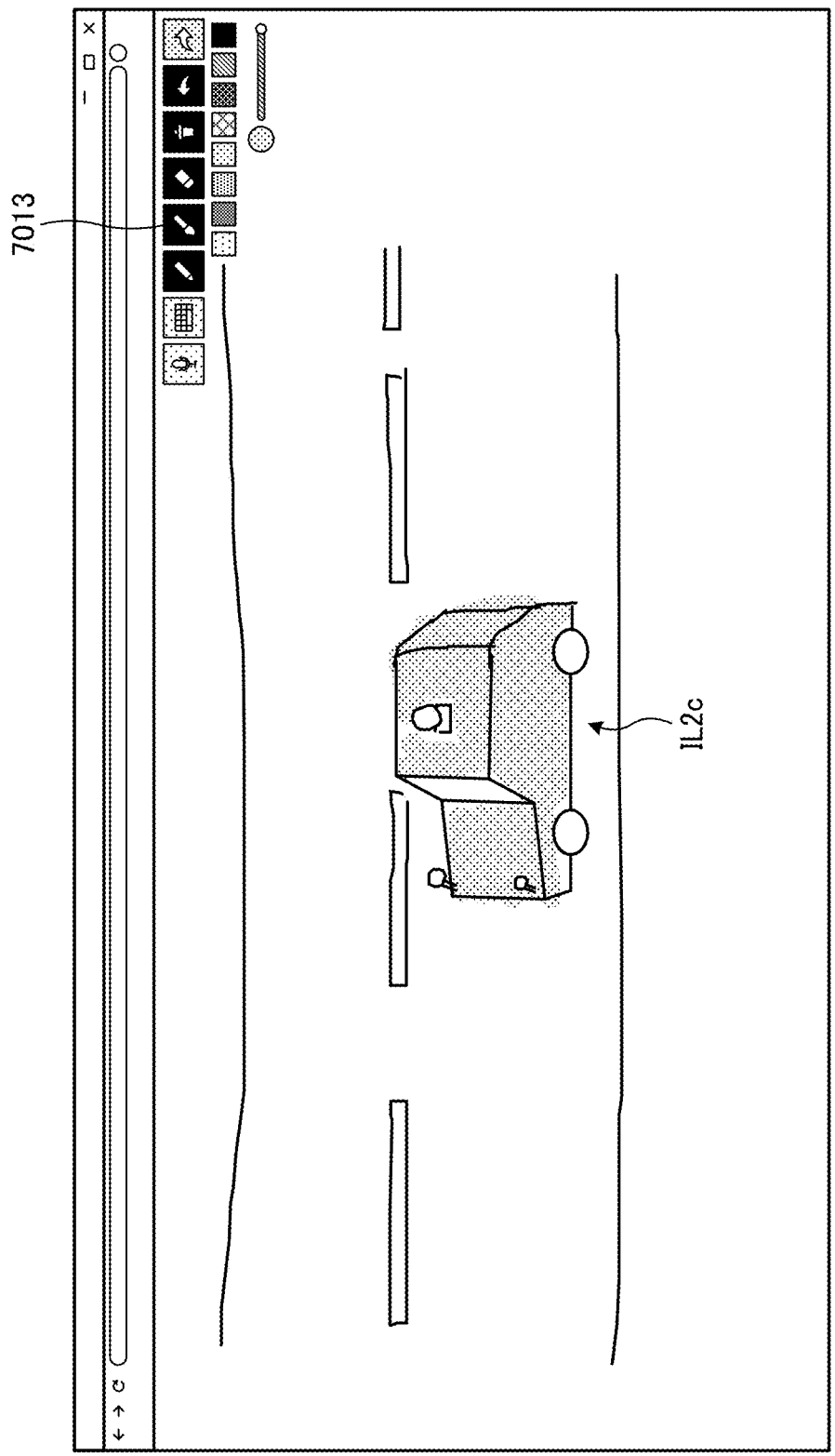
FIG. 27 is a diagram illustrating an example of details of a transition of a display screen displayed by the visual communication system, according to an embodiment of the present disclosure.

In the two-dimensional editing processing, the visual communication system 4 receives the two-dimensional rotation operation, the two-dimensional movement operation, the two-dimensional enlargement operation, the two-dimensional reduction operation, the operation of erasing a part, the operation of adding a handwritten line drawing, and the operation of coloring, for example. In response to these operation request, the visual communication system 4 two-dimensionally changes the appearance of the two-dimensional illustration data IL2 as illustrated in FIG. 25, FIG. 26, and FIG. 27.

In FIG. 25, a line drawing of a landscape as a background of the two-dimensional illustration data IL2 is added by handwriting using the addition button 7013, and the two-dimensional illustration data IL2 is colored using the coloring button 7014.

In FIG. 25, the language information recognition state display icon, the character information, and the thumbnail data displayed in the thumbnail display area 800 in FIG. 23 and FIG. 24-1 are hidden. The timing at which the various information in the thumbnail display area 800 are hidden is appropriately selected from a timing at which pressing of any one of the buttons for the two-dimensional editing processing such as the addition button 7013, the coloring button 7014, and the eraser button 7015 is detected, a timing at which the fixing processing is performed, and a timing at which the two-dimensional editing processing by the user is started, for example.

Even after the two-dimensional editing is performed, the language information recognition function is turned on by pressing the voice input button 7011 or the key input button 7012. In response to the turning on the language information recognition function, various information is displayed in the thumbnail display area 800, new three-dimensional illustration data is displayed and edited on the two-dimensionally edited image, and fixed new two-dimensional illustration data can be added.

In FIG. 26, a part of the line drawing in two-dimensional illustration data IL2b is erased using the eraser button 7015.

In FIG. 27, a line drawing is added to two-dimensional illustration data IL2c using the addition button 7013.

As illustrated in FIG. 23 to FIG. 27, the first stage editing processing (FIG. 23 and FIG. 24-1) and the second stage editing processing (FIG. 25 to FIG. 27) enable to accurately and quickly express an illustration close to one's mind at the time of speaking or inputting a character. Although the description given above is of an example in which the display illustrated in FIG. 17 to FIG. 27 is performed by the visual communication system 4 having the configuration of FIG. 5, in another example, the display is performed by the visual communication system having the configuration of FIG. 9 in any suitable manner. In other words, in the configuration of FIG. 9, the visual communication system 4 searches for a three-dimensional model corresponding to language information and converts the three-dimensional model corresponding to language information to an illustration. Three-dimensional illustration data as the illustration conversion result is displayed in the thumbnail data area 802 of FIG. 17 to FIG. 27. In response to receiving a selection operation of any of one or more three-dimensional illustration data displayed in the thumbnail data area 802, the visual communication system 4 displays the selected three-dimensional illustration data in the drawing result display area 600.

As described above, in the present embodiment, in the visual communication system 4, one or more thumbnail images as candidates for illustrations corresponding to language information are displayed as being switched speedily according to the change of the language information. This enables quick selection of an illustration corresponding to current language information and supports speedy information communication in communication scenes.

Figure 28:
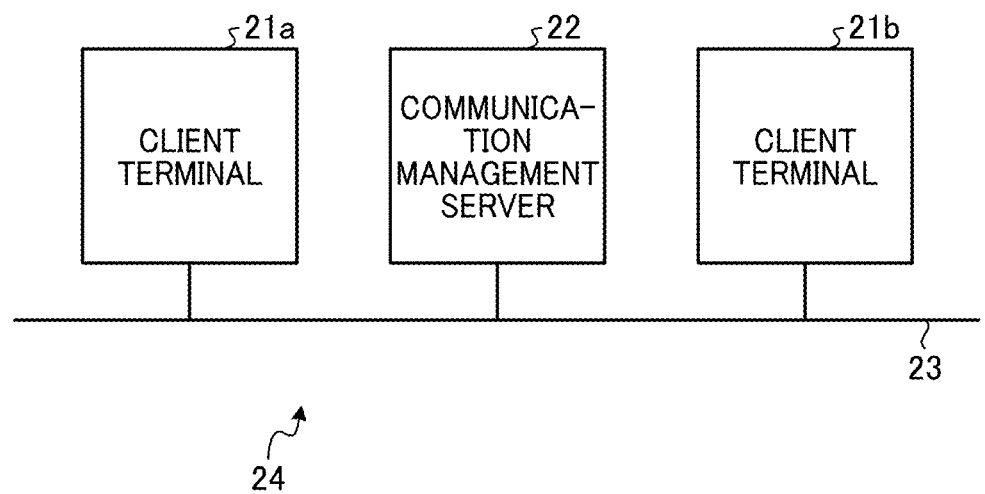
FIG. 28 is a schematic diagram illustrating a system configuration of an online meeting system, according to a variation of an embodiment of the present disclosure.

The concept of the visual communication system 4 can be applied to an online meeting system 24. The online meeting system 24 has a configuration as illustrated in FIG. 28, for example. FIG. 28 is a diagram illustrating an example of the online meeting system 24 according to a variation of the embodiment. Specifically, FIG. 28 illustrates an example in which an online meeting tool is used as the drawing information generation unit 400.

The online meeting system 24 includes multiple client terminals such as a client terminal 21a and a client terminal 21b, a communication management server 22, and a connection unit 23. The connection unit 23 communicably connects the client terminal 21a, the client terminal 21b, and the communication management server 22 to each other. The client terminal 21a and the client terminal 21b are configured to share a display screen implemented by the drawing information generation unit 400.

Figure 29:
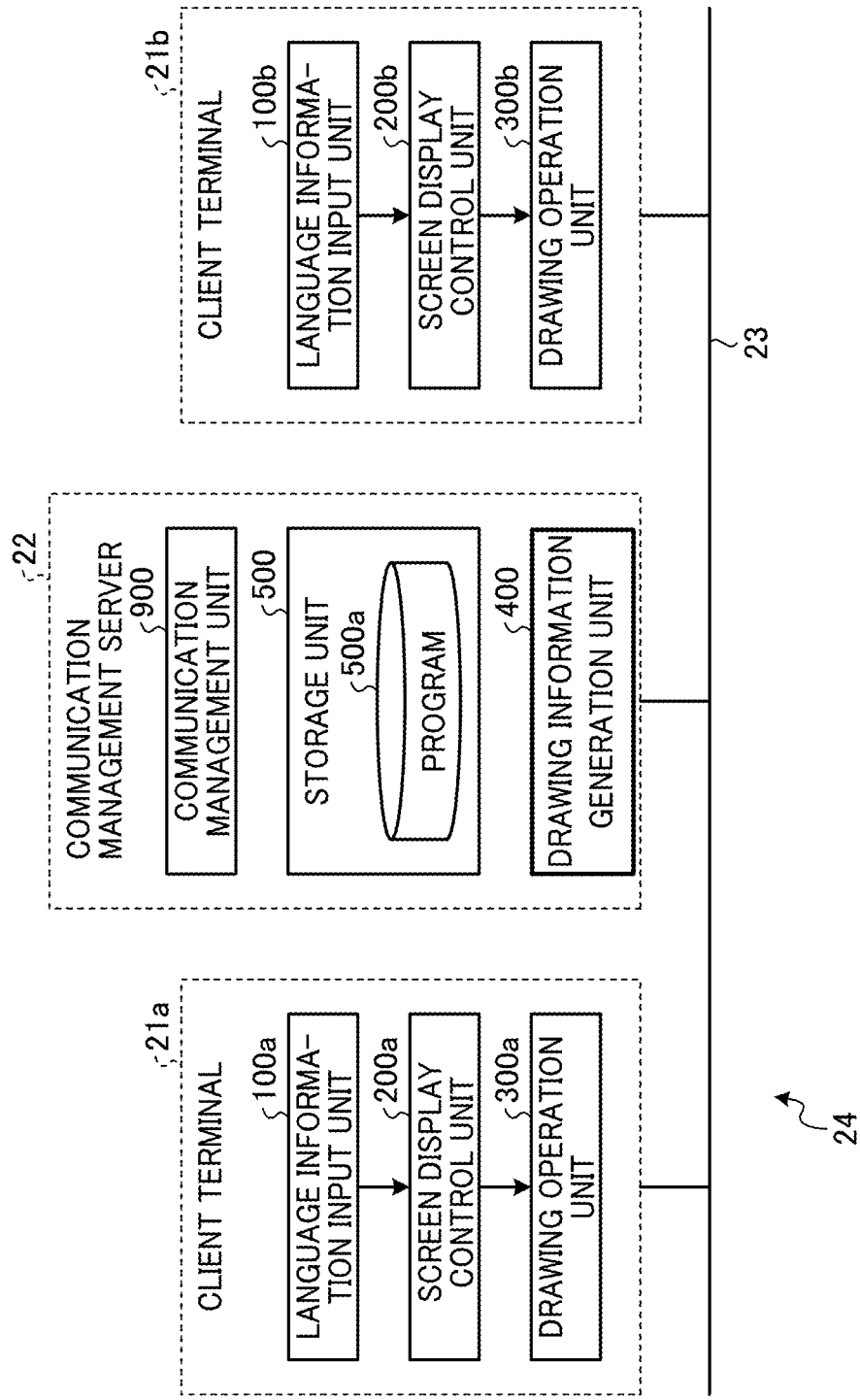
FIG. 29 is a block diagram illustrating a functional configuration of the online meeting system, according to a variation of an embodiment of the present disclosure.

FIG. 29 is a block diagram illustrating an example of a functional configuration of the online meeting system 24. The client terminal 21a includes a language information input unit 100a, a screen display control unit 200a, and a drawing operation unit 300a. The client terminal 21b includes a language information input unit 100b, a screen display control unit 200b, and a drawing operation unit 300b. The functions and operations of the language information input unit 100a and the language information input unit 100b are the same or substantially the same as the functions and operations of the language information input unit 100 of the embodiment. The functions and operations of the screen display control unit 200a and the screen display control unit 200b are the same or substantially the same as the functions and operations of the screen display control unit 200 of the embodiment. The functions and operations of the drawing operation unit 300a and the drawing operation unit 300b are the same or substantially the same as the functions and operations of the drawing operation unit 300 of the embodiment.

The communication management server 22 includes a communication management unit 900 in addition to the drawing information generation unit 400 and the storage unit 500. The functions and operations of the drawing information generation unit 400 are the same or substantially the same as the functions and operations of the drawing information generation unit 400 of the embodiment. The functions and operations of the storage unit 500 are the same or substantially the same as the functions and operations of the storage unit 500 of the embodiment.

The communication management unit 900 receives audio data and image data captured by the camera from the client terminal 21a and the client terminal 21b, which are used by meeting participants respectively, and transmits the received audio data and image data to the other client terminal. The drawing information generation unit 400 generates drawing information of a camera image of an online meeting on which a drawn image is superimposed. The communication management unit 900 transmits the drawing information of the camera image on which the drawn image is superimposed to the other client terminal.

In one example, the drawn image is superimposed on a part of the camera image. In another example, the drawn image is superimposed on an entirety of the camera image. In still another example, the operation palette 700 and the thumbnail display area 800 are superimposed in addition to the drawn image.

A description is now given of an example of a usage scene in which the online meeting system 24 described with reference to FIG. 28 is applied to a telepresence robot.

Figure 30:
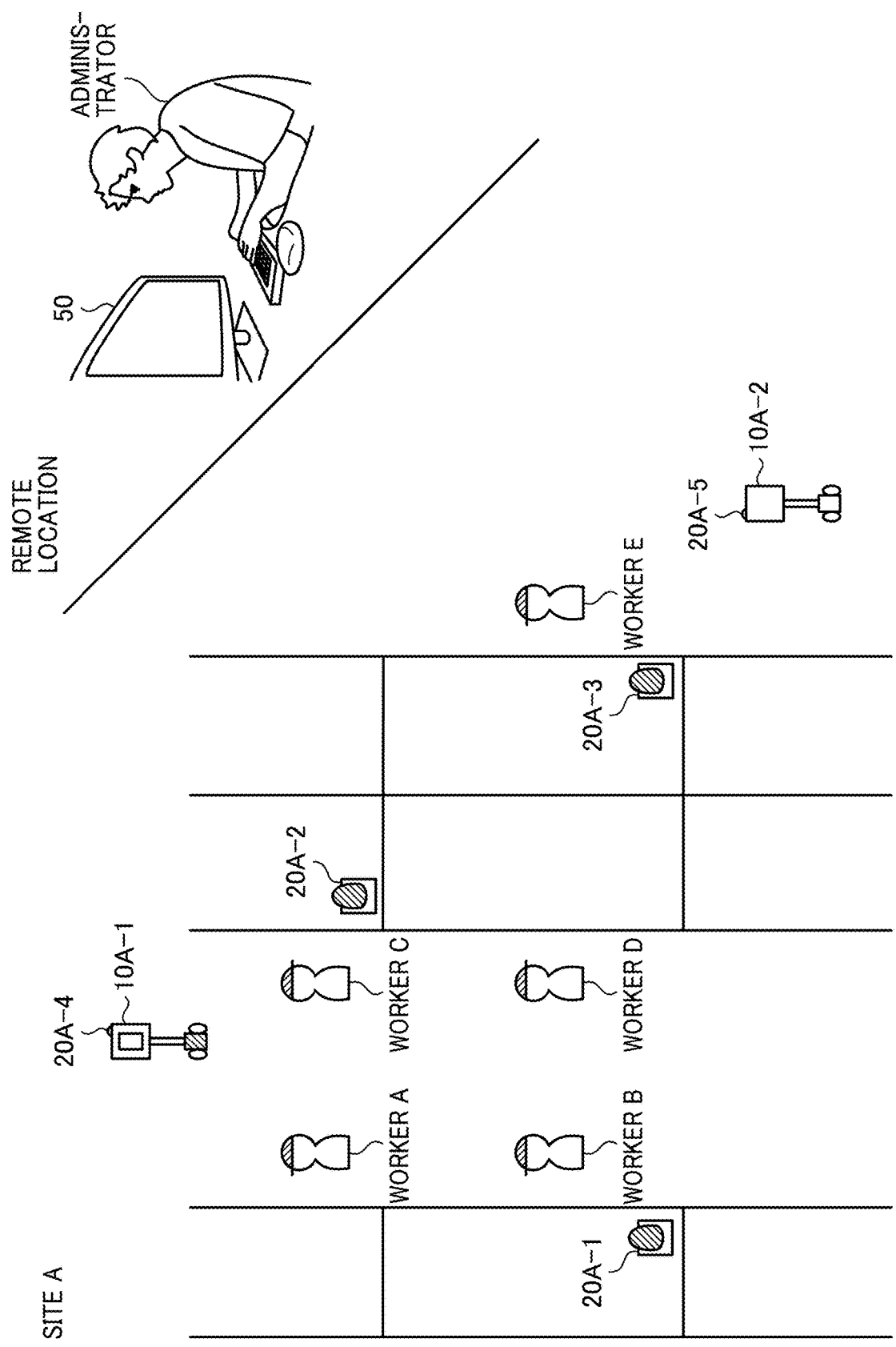
FIG. 30 is a diagram illustrating an example of a usage scene in which the online meeting system is applied to a telepresence robot, according to a variation of an embodiment of the present disclosure.

FIG. 30 is a diagram illustrating an example of a usage scene in which the online meeting system 24 is applied to a telepresence robot. FIG. 30 illustrates an example in which remote communication is performed between telepresence robots (multiple robots 10A) provided in a site A and an administrator terminal 50 used by an administrator at a remote location.

Examples of the site A illustrated in FIG. 30 include, but are not limited to, a factory and a warehouse, in multiple workers (workers A, B, C, and D) performs certain work. As illustrated in FIG. 30, each of workers A, B, C, and D performs work as facing a work table. Further, in the site A, multiple robots 10A including a robot 10A-1 and a robot 10A-2, each autonomously travel in the base A, are provided. Furthermore, the administrator at the remote location performs remote communication with the multiple robots 10A provided in the base A using the administrator terminal 50, to perform maintenance management of the site A.

Multiple notification buttons 20A including a notification button 20A-1, a notification button 20A-2, a notification button 20A-3, a notification button 20A-4, and a notification button 20A-5 are provided in the site A. Among the multiple notification buttons 20A, the notification button 20A-1, the notification button 20A-2, and the notification button 20A-3 are provided on the work tables. The notification button 20A-4 and the notification button 20A-5 are mounted on the robot 10A-1 and the robot 10A-2, respectively. Each of the multiple notification buttons 20A is an operation device for calling the administrator at the remote location from any of the workers at the site A. Each of the multiple notification buttons 20A is merely an example of the operation device. Any suitable devices having a function of calling the administrator suffice. For example, when some abnormality occurs during work and the worker wants to communicate with the administrator, the worker presses any one of the multiple notification buttons 20A provided near the worker to call the administrator at the remote location.

The administrator at the remote location receives a notification indicating a call from the user, triggered by the selection of any one of the multiple notification buttons 20A. The administrator starts remote communication between the administrator terminal 50 and any one or more of the multiple robot 10A provided in the site A, to communicate with the worker.

Further, the robot 10A-1 and the robot 10A-2 that perform remote communication with the administrator terminal 50 move to a movement destination set according to a location or locations where any one or more of the multiple notification buttons 20A pressed by the worker are provided, and perform remote communication with the administrator terminal 50. Therefore, the worker who has pressed any one of the multiple notification buttons 20A can use the any one of the multiple robots 10A to perform remote communication at a desired location where the worker wants to communicate with the administrator.

Considering the utilization of a telepresence robot at a site such as the site A illustrated in FIG. 30, the administrator terminal 50 and each of the multiple robots 10A are applied to the client terminal 21a and the client terminal 21b of FIG. 28, to implement the online meeting system 24 of the present disclosure.

A telepresence robot is a device used in a variety of remote locations in different situations. There may be a situation in which the telepresence robot is operated by a user who is unfamiliar with operating the telepresence robot. However, even in such the situation, an image suitable for explaining what is happening in the site by simple input of voice or text is acquired. Thus, smooth communication is performed at a remote location.

Further, since a keyword and an image are associated with each other, an image can be associated in advance with a language and/or a technical term that is used in a particular remote location where the telepresence robot is used in advance. This enables a user to share an image and communicate with a partner at a remote location, even if the partner uses a different language or does not know technical terms.

Figure 31:
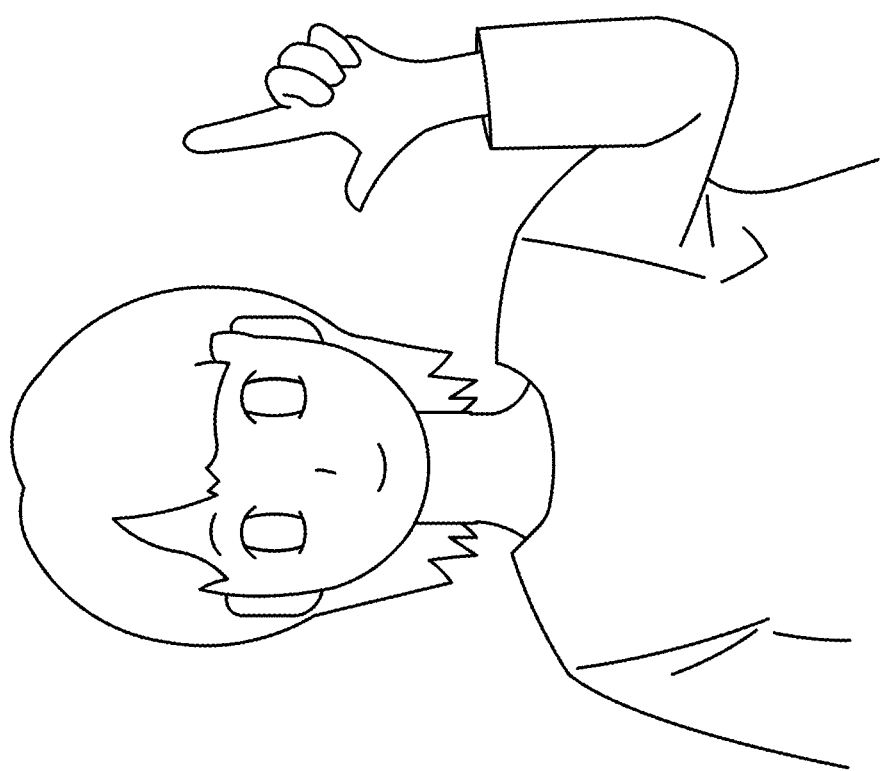
FIG. 31 is a diagram illustrating a camera image captured by a camera of a client terminal, according to a variation of an embodiment of the present disclosure.
Figure 32:
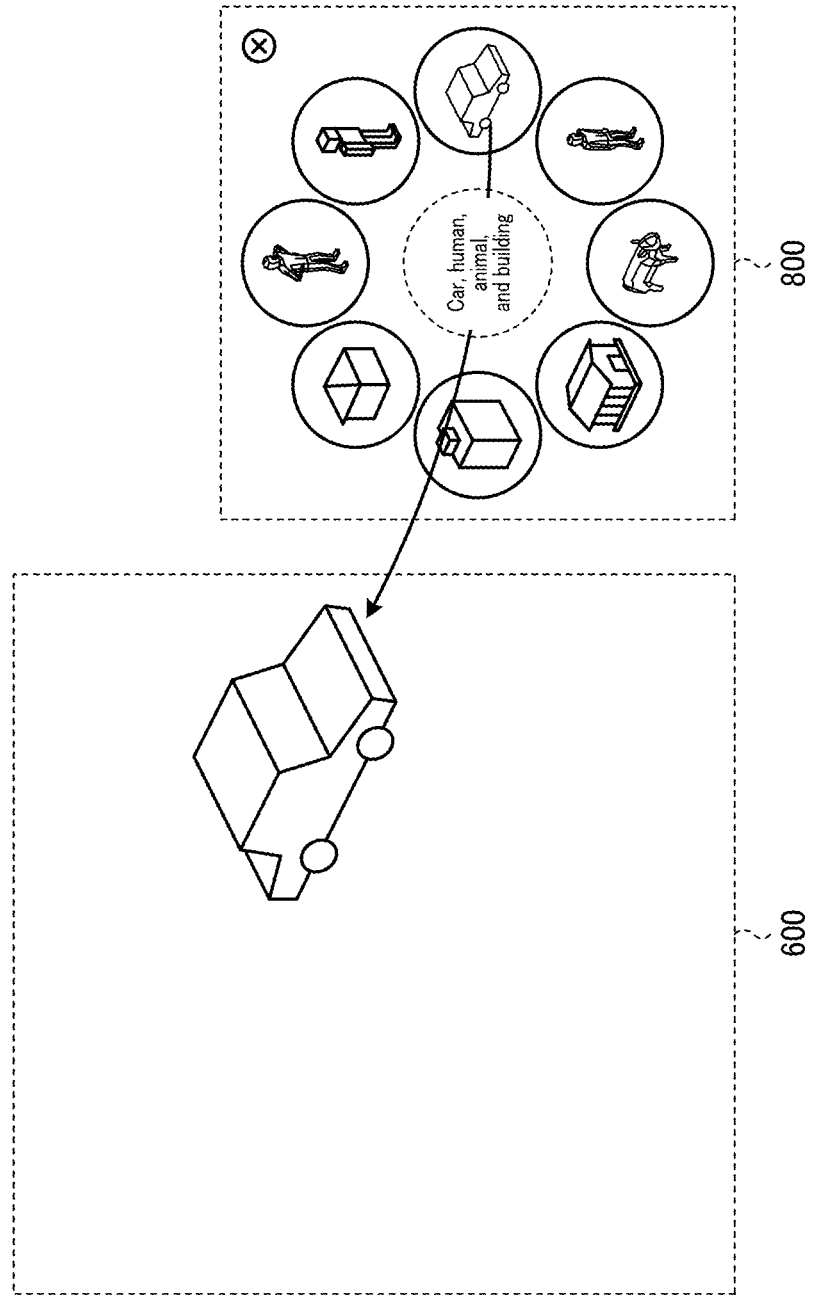
FIG. 32 is a diagram illustrating an image to be superimposed on the camera image of FIG. 31 by a drawing information generation unit, according to a variation of an embodiment of the present disclosure.
Figure 33:
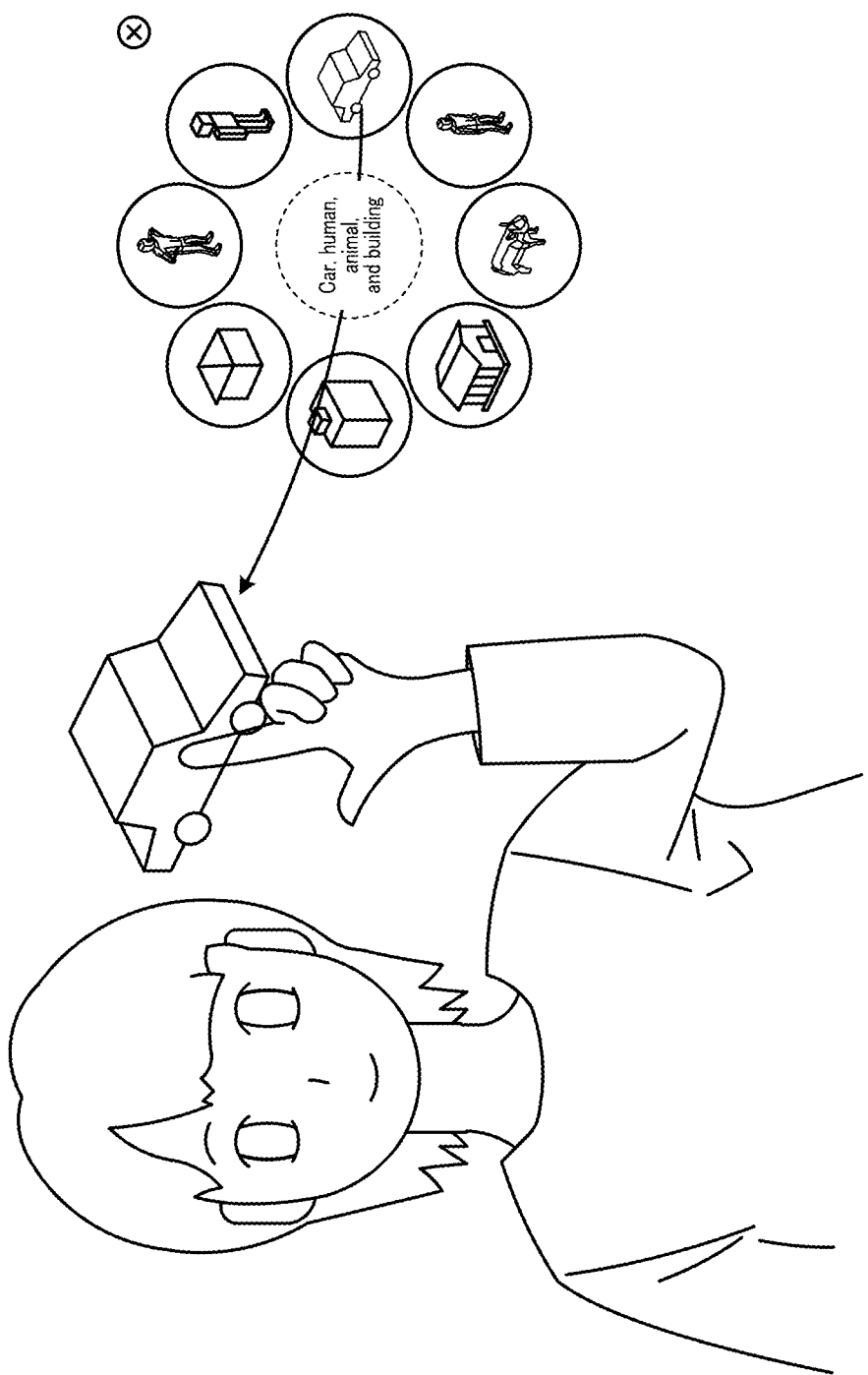
FIG. 33 is a diagram illustrating an image displayed on another client terminal, according to a variation of an embodiment of the present disclosure.

For example, as illustrated in FIG. 31 to FIG. 33, drawing corresponding to a gesture of a user acquired by the motion acquisition device is superimposed on a camera image in which the user appears. FIG. 31 is a diagram illustrating a camera image captured by the camera 520 of the client terminal 21a according to the variation of the embodiment. Specifically, FIG. 31 illustrates the camera image in which a user of the client terminal 21a appears. FIG. 32 is a diagram illustrating an image to be superimposed on the camera image of FIG. 31 by a drawing information generation unit 400, according to a variation of an embodiment of the present disclosure; FIG. 32 illustrates an example in which the drawing result display area 600 and the thumbnail display area 800 are to be superimposed among the drawing result display area 600, the operation palette 700, and the thumbnail display area 800, while the operation palette 700 is not to be superimposed. FIG. 33 is a diagram illustrating an image displayed on the client terminal 21b as the other client terminal, according to the variation of the embodiment. In this case, handwriting performed at a certain client terminal by a user to the display 506 of the certain terminal by the user's finger tip is displayed as an image in which the drawing is superimposed on the camera image by the user's fingertip at the other client terminal.

In another example, a certain gesture is converted into an illustration, and the illustration is displayed in the drawing result display area 600. For example, in response to recognition of a gesture indicating up, down, left, and right with a finger in an image captured by the camera, illustrations of an up arrow, a down arrow, a left arrow, and a right arrow are drawn in the drawing result display area 600. In another example, in response to recognition of a gesture of clapping, an illustration indicating clapping is drawn in the drawing result display area 600. In still another example, when a trail of the fingertip draws a mark such as a circle, an illustration corresponding the mark is drawn. The illustration drawn as described above is also editable in various ways using the two-dimensional data edit button 702.

In still another example, operation is changed based on a combination of a certain gesture and an area in the drawing display. For example, when an image having a shape of a finger illustrated in FIG. 31 moves from the thumbnail display area 800 in the drawing illustrated in FIG. 32 to the drawing result display area 600, such the movement is recognized as a gesture indicating a drop position of drag-and-drop, and operation is performed based on the recognition. On the other hand, when the image of the finger of FIG. 31 is recognized for the first time in the drawing result display area 600, an illustration of an up arrow is drawn in the drawing result display area 600 as illustrated in FIG. 34. There can be other combinations, such as, in response to recognition of a gesture of pinching and releasing with a finger near an illustration already drawn in the drawing result display area 600, the illustration moves.

Other application examples of the image recognition include performing image recognition of a video captured by a camera at a client terminal of a user who is viewing. For example, the client terminal recognizes facial expression such as a smiling face, a sad face, or a serious face, and transmits an illustration corresponding to the recognized facial expression to another certain terminal, e.g., a client terminal of a user who is giving a presentation. Thus, a reaction of the audience is notified to the user who is giving the presentation. In another example, an image or video obtained by superimposing the illustration corresponding to the facial expression on the drawing are shared among the user who is giving the presentation and the other users. This enables all the participants to share a reaction of each user and the reaction of the entire audience.

Thus, visual communication is implemented using an illustration by gesture operations as while communicating such as talking with each other.

The visual communication system 4 and the online meeting system 24 of the embodiments described above are examples of an image editing system or an image display system. Further, the client terminal 1, the client terminal 21*a*, the client terminal 21*b*, the server 2, and the communication management server 22 are examples of an image editing apparatus or a display apparatus.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

Further, the association table of any one of the above-described embodiments may be generated by machine learning. In the present disclosure, machine learning is a technique that enables a computer to acquire human-like learning ability. Machine learning refers to a technology in which a computer autonomously generates an algorithm required for determination such as data identification from learning data loaded in advance, and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

In one example, the program 500*a* executed by the visual communication system 4 or the online meeting system 24 is provided as being stored in advance in a ROM, for example. In another example, the program 500*a* is stored in a computer-readable storage medium, such as a compact disc read only memory (CD-ROM), a flexible disk (FD), a compact disc recordable (CD-R), and a digital versatile disk (DVD), in an installable or executable file format, for distribution. In still another example, the program 500*a* is stored on a computer connected to a network such as the Internet and is downloaded via the network. In still another example, the program 500*a* is provided or distributed via a network such as the Internet.

In conventional arts, illustrations are searched based on selected text, and multiple illustrations displayed in the illustration search result display area of the text are displayed.

According to one or more embodiments of the present disclosure, appropriate visual information relating to communication such as a conversation is provided as the communication using voice or a text input goes on.

According to one or more embodiments, a non-transitory computer-executable medium storing a plurality of instructions is provided, that when executed by one or more processors, cause the one or more processors to perform a method. The method includes receiving an input of language information. The method includes performing recognition on the input language information. The method includes displaying one or more images corresponding to the input language information on a display, based on a result of the recognition.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A communication system comprising circuitry configured to:

receive an input of language information;

perform recognition on the input language information; and display one or more first images corresponding to the input language information in a predetermined area on a display, based on a result of the recognition, wherein the circuitry further displays a second image corresponding to at least one of the first images based on the language information input by the user, the circuitry recognizes the input language information as character information, and the one or more first images displayed on the display is one or more images corresponding to a keyword included in the character information, the circuitry selects a particular image from the one or more images displayed on the display, and displays an image corresponding to the selected particular image on the display, and the circuitry infers an image to be selected next based on a learned model obtained by performing machine learning using the character information and the particular image selected from the displayed one or more images corresponding to the keyword included in the character information as training data, and presents the inferred image to be selected next as an image to be preferentially displayed from among a plurality of images corresponding to the keyword included in the character information.

2. The communication system of claim 1, wherein the circuitry changes at least a part of a display appearance of the one or more images that are already displayed, to display another one or more images corresponding to a keyword included in character information recognized based on newly input language information on the display.

3. The communication system of claim 1, wherein the selected particular image is a thumbnail image of the image corresponding to the selected particular image.

4. The communication system of claim 1, further comprising a memory that stores the keyword in association with the one or more images,
wherein the circuitry retrieves a keyword included in the character information, and
wherein the one or more images displayed on the display is one or more image stored in the memory in association with the retrieved keyword.

5. The communication system of claim 1, wherein the display includes a display of a telepresence robot that is provided in a site and receives control by remote communication from an administrator terminal.

6. The communication system of claim 1, wherein the display includes a display of an administrator terminal that controls a telepresence robot by remote communication.

7. The communication system of claim 1, wherein the displayed one or more images incudes a plurality of images, and
the circuitry selects an image corresponding to an operation by the user of selecting at least one image from the displayed plurality of images.

8. The communication system of claim 1, wherein the circuitry is further configured to:
select an image corresponding to an operation by a user of selecting at least one image from the displayed one or more images; and
display an image corresponding to the selected image in an area within a display area on the display, the area being a different area from the predetermined area.

9. The communication system of claim 8, wherein the communication system has a mode in which the image displayed in the different area is editable.

10. The communication system of claim 1, wherein, in a case that one or more images corresponding to the input language information include a plurality of images, the circuitry determines a priority order in which the plurality of images is to be displayed in the predetermined area, and displays the plurality of images in the predetermined area in the determined priority order.

11. The communication system of claim 1, wherein the circuitry is further configured to:
display character information corresponding to the input language information; and
display an image corresponding to selection by the user with respect to the displayed character information.

12. A display apparatus comprising circuitry configured to:
receive an input of language information;
perform recognition of the input language information;
display one or more first images corresponding to the input language information in a predetermined area on a display, based on a result of the recognition,
wherein the circuitry further displays a second image corresponding to at least one of the first images based on the language information input by the user,
the circuitry recognizes the input language information as character information, and the one or more first images displayed on the display is one or more images corresponding to a keyword included in the character information,
the circuitry selects a particular image from the one or more images displayed on the display, and displays an image corresponding to the selected particular image on the display, and
the circuitry infers an image to be selected next based on a learned model obtained by performing machine learning using the character information and the particular image selected from the displayed one or more images corresponding to the keyword included in the character information as training data, and presents the inferred image to be selected next as an image to be preferentially displayed from among a plurality of images corresponding to the keyword included in the character information.

13. A method for controlling display on a display apparatus, the method comprising:
receiving an input of language information;
performing recognition on the input language information;
displaying one or more first images corresponding to the input language information in a predetermined area on a display, based on a result of the recognition,
displaying a second image corresponding to at least one of the first images based on the language information input by the user,
recognizing the input language information as character information, wherein the one or more first images displayed on the display is one or more images corresponding to a keyword included in the character information,
selecting a particular image from the one or more images displayed on the display, and displaying an image corresponding to the selected particular image on the display, and
inferring an image to be selected next based on a learned model obtained by performing machine learning using the character information and the particular image selected from the displayed one or more images corresponding to the keyword included in the character information as training data, and presenting the inferred image to be selected next as an image to be preferentially displayed from among a plurality of images corresponding to the keyword included in the character information.

* * * * *